(12) United States Patent
Charmot et al.

(10) Patent No.: US 6,518,364 B2
(45) Date of Patent: Feb. 11, 2003

(54) EMULSION LIVING-TYPE FREE RADICAL POLYMERIZATION, METHODS AND PRODUCTS OF SAME

(75) Inventors: Dominique Charmot, Los Gatos, CA (US); Han Ting Chang, Livermore, CA (US); Peter Huefner, San Jose, CA (US); Yunxiao Li, San Jose, CA (US)

(73) Assignee: Symyx Technologies, Inc., Santa Clara, CA (US)

( * ) Notice: Subject to any disclaimer, the term of this patent is extended or adjusted under 35 U.S.C. 154(b) by 0 days.

(21) Appl. No.: 09/963,235

(22) Filed: Sep. 25, 2001

(65) Prior Publication Data

US 2002/0065380 A1 May 30, 2002

Related U.S. Application Data

(63) Continuation-in-part of application No. 09/676,267, filed on Sep. 28, 2000, now Pat. No. 6,380,335.

(51) Int. Cl.$^7$ ............................. C08F 2/38; C07C 333/00
(52) U.S. Cl. ................... 525/259; 526/219; 526/219.1; 526/219.2; 526/220; 558/235
(58) Field of Search ............... 526/219, 219.1, 526/219.2, 220; 525/259

(56) References Cited

U.S. PATENT DOCUMENTS

| | | | |
|---|---|---|---|
| 3,580,830 A | 5/1971 | Siebert et al. | 204/159.24 |
| 5,089,601 A | 2/1992 | Ozoe et al. | 528/390 |
| 5,314,962 A | 5/1994 | Otsu et al. | 525/280 |
| 5,356,947 A | 10/1994 | Ali et al. | 522/57 |
| 6,153,705 A | 11/2000 | Corpart et al. | 525/244 |

FOREIGN PATENT DOCUMENTS

| | | | |
|---|---|---|---|
| WO | WO 98/01478 | 1/1998 | C08F/2/38 |
| WO | WO 98/58974 | 12/1998 | C08F/293/00 |
| WO | WO 99/05099 | 2/1999 | C07C/327/36 |
| WO | WO 99/31144 | 6/1999 | C08F/2/38 |
| WO | WO 99/35177 | 7/1999 | C08F/293/00 |

OTHER PUBLICATIONS

Otsu et al., 1998, *Advances in Polymer Science*, vol.:136, pp. 75–137 "Controlled Synthesis of Polymers Using the Iniferter Technique: Developments In Living Radical Polymerization".

Castro et al., 1984, *J. Org. Chem* vol. 49:863–866 "Kinetics and Mechanism of the Addition of Amines to Carbon Disulfide in Ethanol".

*Journal of Polymer Science*:Part A: *Polymer Chemistry*, vol. 38, 3864–3874, 2000.

*Journal of Polymer Science*: Part A: *Polymer Chemistry*, vol. 38, 4206–4217, 2000.

*Macromolecular Symposia*, 2000, 150, 23.

Houben–Weyl, *Methoden der organischen Chemie*, vol. XIV/1, Makromolekulare Stoffe, Georg–Thieme–Verlag, Stuttgart, 1961, pp 192–208.

Houben–Weyl, *Methoden der organischen Chemie*, vol. XIV/1, Makromolekulare Stoffe, Georg–Thieme–Verlag, Stuttgart, 1961, pp 411–420.

*Primary Examiner*—James J. Seidleck
*Assistant Examiner*—Olga Asinovsky

(57) ABSTRACT

Heterogeneous (e.g., emulsion) polymerization systems include a control agent that has a nitrogen-nitrogen bond covalently bonded to a thiocarbonyl moiety for living-type free radical polymerization of a wide variety of monomers. These control agents provide superior properties for control of the polymerization and/or the properties of the polymers obtained and/or the monomers that may be polymerized. Multifunctional control agents provide the opportunity for a variety of structurally unique polymers, including block copolymers, stars and hyper-branched polymers.

24 Claims, No Drawings

US 6,518,364 B2

EMULSION LIVING-TYPE FREE RADICAL POLYMERIZATION, METHODS AND PRODUCTS OF SAME

This application is a continuation-in-part of commonly assigned, pending U.S. patent application No. 09/676,267, filed Sep. 28, 2000, which is incorporated herein by reference for all purposes and to which benefit is claimed.

FIELD OF THE INVENTION

The present invention relates to compounds useful in assisting in the emulsion polymerization of monomers in a free radical polymerization that has living-type kinetics. Heterogeneous mixtures (e.g., dispersions, etc.) and/or polymers made with the control agents and processes for polymerization are also included. In addition, some of the compounds themselves are novel.

BACKGROUND OF THE INVENTION

The use and mechanism of control agents for free radical polymerization is now generally known, see for example U.S. Pat. No. 6,153,705, WO98/01478, WO99/35177, WO99/31144, and WO98/58974, each of which is incorporated herein by reference. Nonetheless, there remains a need for new agents, which provide better properties in certain systems, such as emulsion polymerization.

For example, the previously known control agents have limited uses. Although touted as universally useful, those of skill in the art appreciate that a particular control agent is particularly useful for the control of particular monomers and monomer mixtures. The polymerization conditions under which particular control agents are particularly useful are generally not well known. Thus, a need exists for a family of related control agents that can be easily synthesized and modified so that a control agent will be readily available for polymerizing desired monomers under commercially acceptable conditions, which include high conversion at the shortest possible reaction times and lower temperatures.

Additionally, there is a strong need in the industry to make block copolymers in emulsion processes. From a process point of view, emulsions are advantageous over bulk or solution processes because emulsion processes allow for relative ease of heat removal, use of environmentally friendly water as liquid vehicle (as compared to organic solvents), ease of polymer handling and purification (e.g., stripping off residual monomers), high solid content with high molecular weight, and relatively low cost operations. From an application point of view, emulsion polymers currently are used extensively in waterborne formulations (such as coating, adhesives, and- textiles). The preparation of block copolymers in an emulsion has long been sought for without commercializable results. Although resin emulsification techniques have been used to form emulsions of thermoplastic elastomers (such as polystyrene-b-polydiene-b-polystyrene triblock copolymers), there has been no commercial significance due to high costs and limited chemical composition ranges.

Recently, living free radical polymerization (LFRP) (sometimes referred to as controlled free radical polymerization) has been shown to be a viable technique to prepare a large diversity of block copolymers. However, despite many attempts, none of these techniques have currently lead to commercial processes when applied in emulsion polymerization. Nitroxide mediated LFRP can require temperatures inappropriate for emulsion processes, with nitroxide mini-emulsion processes providing acceptable results, but with drastically limited industrial applicability. ATRP has the main drawback of introducing heavy metals in the final emulsion, which causes environmental concerns and also is detrimental to the latex stability. Several reports have shown that dithioesters in RAFT emulsion polymerization produce substantial retardation, latex that contains high level of grit, and polymer with poor control (e.g., polydispersity of 1.8 and higher) (see, for example, *Journal of Polymer Science: Part A : Polymer Chemistry*, Vol. 38, 3864–3874, 2000). Mini-emulsions have been used to alleviate these difficulties to some extent, but again this very much limits its industrial application. Moreover dithioesters impart a deep pink color to the final emulsions. Other dithiocompounds, such as dithiocarbonates (xanthates) are less prone to grit formation, but they exhibit much less control over polymer characteristics, such as polydispersity than dithioesters, dithiocarbamates and dithiocarbazates. For instance polydispersity of 3 are reported for the emulsion polymerization of butyl acrylate and styrene when dithiocarbonates are used, see. e.g., *Macromolecular Symposia*, 2000, 150, 23 and *Journal of Polymer Science: Part A: Polymer Chemistry*, Vol. 38, 4206–4217, 2000.

This invention solves these issues by providing control agents that can be easily modified for particular monomers and monomer mixtures in emulsion systems. Certain dithiocarbazates have superior properties in providing good control over the polymer characteristics together with good latex stability and a high rate of polymerization.

SUMMARY OF THE INVENTION

This invention provides control agents that are easy to prepare and economically useful on a commercial scale in emulsion. In general, the control agents of this invention have a N—N bond covalently bonded to a thiocarbonyl moiety, with an optionally substituted double bonded alkenyl moiety. The control agents can be characterized by the general formula:

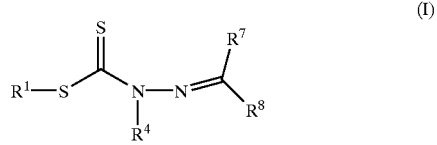

(I)

wherein $R^1$ is generally any group that is sufficiently labile to be expelled as its free radical form; $R^4$ is selected from the group consisting of hydrogen, hydrocarbyl, substituted hydrocarbyl, heteroatom-containing hydrocarbyl, and substituted heteroatom-containing hydrocarbyl, and combinations thereof; and $R^7$ and $R^8$ are independently selected from the group consisting of hydrogen, hydrocarbyl, substituted hydrocarbyl, heteroatom-containing hydrocarbyl, and substituted heteroatom-containing hydrocarbyl, and combinations thereof.

These control agents are used in an emulsion polymerization process by forming a heterogeneous mixture and subjecting that mixture to polymerization conditions. The heterogeneous mixture comprises the control agent, one or more monomers, water, initiator and optionally surfactant. Polymerization conditions include the pressure, temperature and other process conditions, such a polymerization method (e.g., batch, semi-batch or continuous).

Another aspect of this invention is directed toward multifunctional control agents, so that the control agents may occupy either a central portion of a polymer chain and/or two or more ends of a polymer.

Other aspects of this invention include certain of the control agents, which are novel compounds. Polymerization processes using all of the control agents of this invention and polymers that can be made with the control agents of this invention are additional aspects of this invention. In particular, the control agents of this invention provide living-type kinetics and as such allow for the preparation of desired products, including block polymers, star architectures, grafts and hyperbranched polymers.

Thus, it is an object of this invention to provide novel control agents for a living-type free radical polymerization process.

It is another object of this invention to provide novel compounds, which are useful as control agents in a free radical polymerization process.

It is a further object of this invention to provide a novel system for free radical polymerization of monomers that employs living-type kinetics.

It is still a further object of this invention to polymerize a variety of monomers under commercially acceptable conditions with a family of control agents.

It is yet a further object of this invention to make controlled architecture polymers with a polymerization process that employs a control agent.

Further aspects and objects of this invention will be evident to those of skill in the art upon review of this specification.

DETAILED DESCRIPTION OF THE INVENTION

In describing and claiming the present invention, the following terminology will be used in accordance with the definitions set out below. A named R group will generally have the structure that is recognized in the art as corresponding to R groups having that name. For the purposes of illustration, representative R groups as enumerated above are defined herein. These definitions are intended to supplement and illustrate, not preclude, the definitions known to those of skill in the art.

It is also to be understood that the terminology used herein is for the purpose of describing particular embodiments only, and is not intended to be limiting. As used in this specification and the appended claims, the singular forms "a," "an" and "the" include plural referents unless the context clearly dictates otherwise. In describing and claiming the present invention, the following terminology will be used in accordance with the definitions set out below.

The following definitions pertain to chemical structures, molecular segments and substituents:

As used herein, the phrase "having the structure" is not intended to be limiting and is used in the same way that the term "comprising" is commonly used. The term "independently selected from the group consisting of" is used herein to indicate that the recited elements, e.g., R groups or the like, can be identical or different (e.g., $R^2$ and $R^3$ in the structure of formula (1) may all be substituted alkyl groups, or $R^2$ may be hydrido and $R^3$ may be methyl, etc.).

"Optional" or "optionally" means that the subsequently described event or circumstance may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

The term "alkyl" as used herein refers to a branched or unbranched saturated hydrocarbon group typically although not necessarily containing 1 to about 24 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein contain 1 to about 12 carbon atoms. The term "lower alkyl" intends an alkyl group of one to six carbon atoms, preferably one to four carbon atoms. "Substituted alkyl" refers to alkyl substituted with one or more substituent groups, and the terms "heteroatom-containing alkyl" and "heteroalkyl" refer to alkyl in which at least one carbon atom is replaced with a heteroatom.

The term "alkenyl" as used herein refers to a branched or unbranched hydrocarbon group typically although not necessarily containing 2 to about 24 carbon atoms and at least one double bond, such as ethenyl, n-propenyl, isopropenyl, n-butenyl, isobutenyl, octenyl, decenyl, and the like. Generally, although again not necessarily, alkenyl groups herein contain 2 to about 12 carbon atoms. The term "lower alkenyl" intends an alkenyl group of two to six carbon atoms, preferably two to four carbon atoms. "Substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "alkynyl" as used herein refers to a branched or unbranched hydrocarbon group typically although not necessarily containing 2 to about 24 carbon atoms and at least one triple bond, such as ethynyl, n-propynyl, isopropynyl, n-butynyl, isobutynyl, octynyl, decynyl, and the like. Generally, although again not necessarily, alkynyl groups herein contain 2 to about 12 carbon atoms. The term "lower alkynyl" intends an alkynyl group of two to six carbon atoms, preferably three or four carbon atoms. "Substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group containing one to six, more preferably one to four, carbon atoms. The term "aryloxy" is used in a similar fashion, with aryl as defined below.

Similarly, the term "alkyl thio" as used herein intends an alkyl group bound through a single, terminal thioether linkage; that is, an "alkyl thio" group may be represented as —S-alkyl where alkyl is as defined above. A "lower alkyl thio" group intends an alkyl thio group containing one to six, more preferably one to four, carbon atoms.

The term "allenyl" is used herein in the conventional sense to refer to a molecular segment having the structure —CH=C=CH$_2$. An "allenyl" group may be unsubstituted or substituted with one or more non-hydrogen substituents.

The term "aryl" as used herein, and unless otherwise specified, refers to an aromatic substituent containing a single aromatic ring or multiple aromatic rings that are fused together, linked covalently, or linked to a common group such as a methylene or ethylene moiety. The common linking group may also be a carbonyl as in benzophenone, an oxygen atom as in diphenylether, or a nitrogen atom as in diphenylamine. Preferred aryl groups contain one aromatic ring or two fused or linked aromatic rings, e.g., phenyl, naphthyl, biphenyl, diphenylether, diphenylamine, benzophenone, and the like. In particular embodiments, aryl substituents have 1 to about 200 carbon atoms, typically 1 to about 50 carbon atoms, and preferably 1 to about 20 carbon atoms. "Substituted aryl" refers to an aryl moiety substituted with one or more substituent groups, (e.g., tolyl, mesityl and perfluorophenyl) and the terms "heteroatom-containing aryl" and "heteroaryl" refer to aryl in which at least one carbon atom is replaced with a heteroatom.

The term "aralkyl" refers to an alkyl group with an aryl substituent, and the term "aralkylene" refers to an alkylene group with an aryl substituent; the term "alkaryl" refers to an aryl group that has an alkyl substituent, and the term "alkarylene" refers to an arylene group with an alkyl substituent.

The terms "halo" and "halogen" are used in the conventional sense to refer to a chloro, bromo, fluoro or iodo substituent. The terms "haloalkyl," "haloalkenyl" or "haloalkynyl" (or "halogenated alkyl," "halogenated alkenyl," or "halogenated alkynyl") refers to an alkyl, alkenyl or alkynyl group, respectively, in which at least one of the hydrogen atoms in the group has been replaced with a halogen atom.

The term "heteroatom-containing" as in a "heteroatom-containing hydrocarbyl group" refers to a molecule or molecular fragment in which one or more carbon atoms is replaced with an atom other than carbon, e.g., nitrogen, oxygen, sulfur, phosphorus or silicon. Similarly, the term "heteroalkyl" refers to an alkyl substituent that is heteroatom-containing, the term "heterocyclic" refers to a cyclic substituent that is heteroatom-containing, the term "heteroaryl" refers to an aryl substituent that is heteroatom-containing, and the like. When the term "heteroatom-containing" appears prior to a list of possible heteroatom-containing groups, it is intended that the term apply to every member of that group. That is, the phrase "heteroatom-containing alkyl, alkenyl and alkynyl" is to be interpreted as "heteroatom-containing alkyl, heteroatom-containing alkenyl and heteroatom-containing alkynyl."

"Hydrocarbyl" refers to univalent hydrocarbyl radicals containing 1 to about 30 carbon atoms, preferably 1 to about 24 carbon atoms, most preferably 1 to about 12 carbon atoms, including branched or unbranched, saturated or unsaturated species, such as alkyl groups, alkenyl groups, aryl groups, and the like. The term "lower hydrocarbyl" intends a hydrocarbyl group of one to six carbon atoms, preferably one to four carbon atoms. "Substituted hydrocarbyl" refers to hydrocarbyl substituted with one or more substituient groups, and the terms "heteroatom-containing hydrocarbyl" and "heterohydrocarbyl" refer to hydrocarbyl in which at least one carbon atom is replaced with a heteroatom.

By "substituted" as in "substituted hydrocarbyl," "substituted aryl," "substituted alkyl," "substituted alkenyl" and the like, as alluded to in some of the aforementioned definitions, is meant that in the hydrocarbyl, hydrocarbylene, alkyl, alkenyl or other moiety, at least one hydrogen atom bound to a carbon atom is replaced with one or more substituents that are functional groups such as hydroxyl, alkoxy, thio, phosphino, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alky, alkenyl and alkynyl" is to be interpreted as "optionally substituted alkyl, optionally substituted alkenyl and optionally substituted alkynyl."

As used herein the term "silyl" refers to the $-SiZ^1Z^2Z^3$ radical, where each of $Z^1$, $Z^2$, and $Z^3$ is independently selected from the group consisting of hydrido and optionally substituted alkyl, alkenyl, alkynyl, aryl, aralkyl, alkaryl, heterocyclic, alkoxy, aryloxy and amino.

As used herein, the term "phosphino" refers to the group $-PZ^1Z^2$, where each of $Z^1$ and $Z^2$ is independently selected from the group consisting of hydrido and optionally substituted alkyl alkenyl, alkynyl, aryl, aralkyl, alkaryl, heterocyclic and amino.

The term "amino" is used herein to refer to the group $-NZ^1Z^2$, where each of $Z^1$ and $Z^2$ is independently selected from the group consisting of hydrido and optionally substituted alkyl, alkenyl, alkynyl, aryl, aralkyl, alkaryl and heterocyclic.

The term "thio" is used herein to refer to the group $-SZ^1$, where $Z^1$ is selected from the group consisting of hydrido and optionally substituted alkyl, alkenyl, alkynyl, aryl, aralkyl, alkaryl and heterocyclic.

As used herein all reference to the elements and groups of the Periodic Table of the Elements is to the version of the table published by the Handbook of Chemistry and Physics, CRC Press, 1995, which sets forth the new IUPAC system for numbering groups.

This invention provides novel compounds and control agents useful for the control of free radical polymerization emulsion reactions. In general a free radical polymerization is carried out with these control agents by creating a heterogeneous mixture of at least one polymerizable monomer, the control agent, water, optionally surfactant and at least one source of free radicals, e.g., an initiator. After or upon forming the polymerization mixture, the mixture is subjected to polymerization conditions. Polymerization conditions are those conditions that cause the at least one monomer to form at least one polymer, as discussed herein, such as temperature, pressure, atmosphere, ratios of starting components used in the polymerization mixture, reaction time or external stimuli of the polymerization mixture.

Control Agents

Generally, the control agents of this invention may be characterized by the general formula:

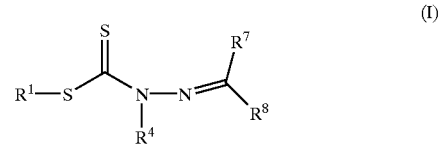

(I)

wherein $R^1$ is generally any group that can be easily expelled under its free radical form ($R^1 \bullet$) upon an addition-fragmentation reaction, as depicted below in Scheme 1:

Scheme 1

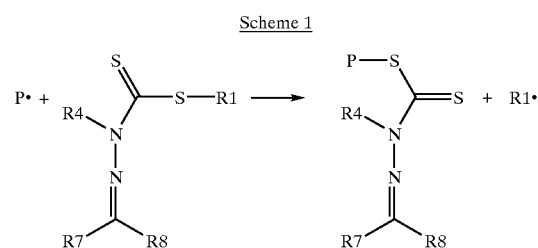

In Scheme 1, P• is a free radical, typically a macroradical, such as polymer chain. More specifically, $R^1$ is selected from the group consisting of hydrocarbyl, substituted hydrocarbyl, heteroatom-containing hydrocarbyl, and substituted heteroatom-containing hydrocarbyl, and combinations thereof. Even more specifically, $R^1$ is selected from the group consisting of optionally substituted alkyl, optionally substituted aryl, optionally substituted alkenyl, optionally substituted alkoxy, optionally substituted heterocyclyl, optionally substituted alkylthio, optionally substituted amino and optionally substituted polymer chains. And still more specifically, $R^1$ is selected from the group consisting of —$CH_2Ph$, —$CH(CH_3)CO_2CH_2CH_3$, —$CH(CO_2CH_2CH_3)_2$, —$C(CH_3)_2CN$, —$CH(Ph)CN$ and —$C(CH_3)_2Ph$.

$R^4$ is selected from the group consisting of hydrogen, hydrocarbyl, substituted hydrocarbyl, heteroatom-containing hydrocarbyl, and substituted heteroatom-containing hydrocarbyl, and combinations thereof. More specifically, $R^4$ is selected from the group consisting of hydrogen, optionally substituted alkyl, optionally substituted aryl, optionally substituted alkenyl, optionally substituted acyl, optionally substituted, aroyl, amino, thio, optionally substituted aryloxy and optionally substituted alkoxy. Preferred $R^4$ groups include methyl and phenyl.

In some embodiments, $R^4$ is a bulky moiety, which may be characterized by the general formula:

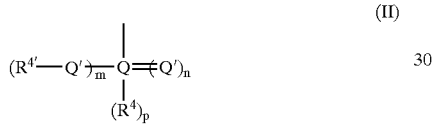

(II)

wherein $R^4$ is as defined above and Q is selected from the group consisting of carbon, sulfur and phosphorus (C, S and P); Q' is selected from the group consisting of oxygen and sulfur (O and S); $R^{4'}$ is typically selected from the same group as $R^4$; and n, m and p are each either 0, 1 or 2 to satisfy the valency of Q. Thus, for example, when Q is carbon, n and p may both be 1 and m is 0. Another example for when Q is carbon is that n is 1 and m is 1 and p is 0. Also for example, when Q is phosphorus, n is 1 and m is 2. Also for example, when Q is sulfur, n is 1 or 2, but typically 2; and m is typically 0 and p is 1. In some preferred embodiments, Q is carbon or sulfur and Q' is oxygen. In these preferred embodiments, $R^4$ and $R^{4'}$ are each independently more preferably selected from the group consisting of optionally substituted alkyl and optionally substituted aryl.

$R^7$ and $R^8$ are each independently selected from the group consisting of hydrogen, hydrocarbyl, substituted hydrocarbyl, heteroatom-containing hydrocarbyl, and substituted heteroatom-containing hydrocarbyl, and combinations thereof. More specifically, $R^7$ and $R^8$ may be each independently selected from the group consisting of hydrogen, optionally substituted alkyl, optionally substituted aryl, optionally substituted alkenyl, optionally substituted acyl, optionally substituted, aroyl, optionally substituted alkoxy, optionally substituted heteroaryl, optionally substituted heterocyclyl, optionally substituted alkylsulfonyl, optionally substituted alkylsulfinyl, optionally substituted alkylphosphonyl, optionally substituted arylsulfinyl, and optionally substituted arylphosphonyl. Specific embodiments of $R^7$ and/or $R^8$ are listed in the above definitions, and in addition include perfluorenated aromatic rings, such as perfluorophenyl. Preferred embodiments of $R^7$ and/or $R^8$ include methyl and phenyl.

Specific control agents within these formulas include:

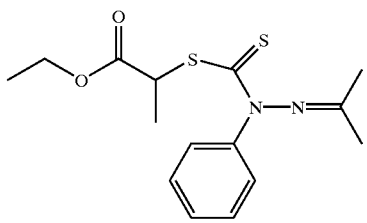

This invention also includes multi-functional control agents and their use in free radical polymerization. A multi-functional control agent is a molecule that allows for two or more polymer chains to polymerize from a single control agent molecule. In some embodiments, the control agents are attached to a core that has multiple functional sites for attachment of one portion of a control agent. Thus, in some embodiments, $R^2$, $R^3$ and/or $R^4$ forms part of or is attached to a core molecule. In other embodiments, $R^1$ is part of or attached to a core molecule. These multi-functional control agents may be characterized by any of the following general formulas:

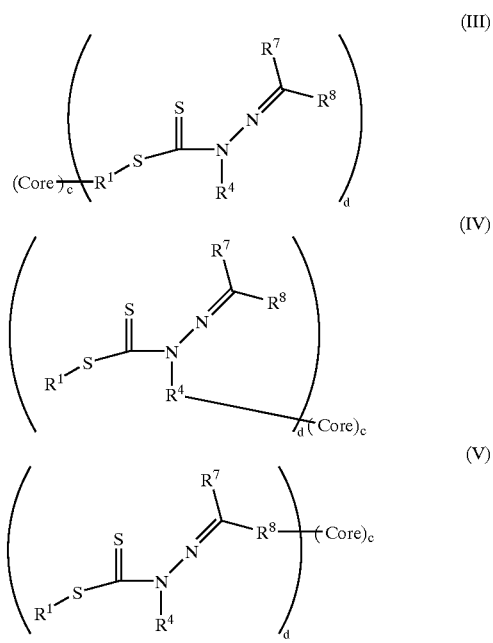

wherein Core is a core molecule, and $R^1$, $R^4$, $R^7$ and $R^8$ are as defined above, c is 1 or more and d is 2 or more. Formulas (V), (VI) and (VII) include multiple core molecules, providing many possible points from which a free radical polymerization may be controlled. This provides the ability to make may different architectures for polymers, some of which are discussed below. For example, for a star architecture polymer c is 1 and d is 3 for a three arm star; c is 1 and d is 4 for a 4 arm star; c is 1 and d is 6 for a six arm star; etc. Also for example, for a grafted polymer, c is 1 and d is 2 for two grafts, etc. For a hyper-branched polymer, c is 2 or more and d is 2 or more.

The Core molecule may be selected from the group consisting of dendritic molecules, small molecules and polymers with at least two terminus ends. Thus, Core molecule may be optionally substituted hydrocarbyl and optionally substituted heteroatom containing hydrocarbyl.

Specific examples of Core molecules include:

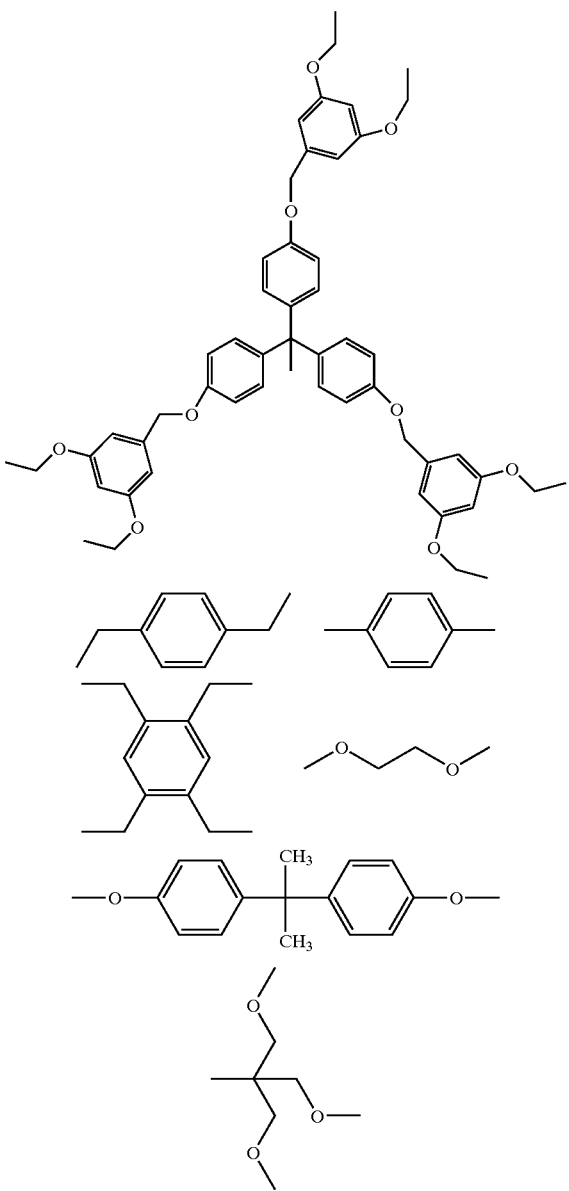

In other embodiments, the Core will be a polymer chain. These embodiments allow for the preparation of grafts or block copolymers by attaching control agents to two or more points along the polymer backbone or side chains or polymer termimi.

The control agents of this invention are synthesized, generally, by methods known to those of skill in the art. The general synthetic approach comprises the nitrogen nucleophilic addition to carbon disulfide and alkylation of the resulted dithiocarbazate with alkylhalides in a one-pot methodology. Most of hydrazines and their derivatives are available commercially from known chemical sources. For the control agents in this invention, hydrazone formation as shown in scheme 2 is generally employed for sythesis:

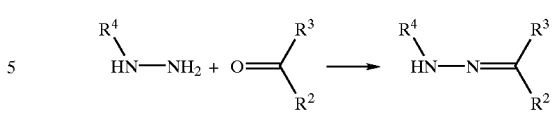

Scheme 2

This method is similar to those published in scientific journals, e.g., Castro et al., *J Org. Chem.*, 1984, 49, 863, which is incorporated herein by reference.

The synthesis conditions optimized for these particular nucleophiles—hydrazines and their derivatives include: temperature in the range of 0° C. to ambient; solvents—alcohols, acetone, acetonitrile, dioxane, DMF, DMSO; base—sodium hydroxide, potassium hydroxide, and sodium hydride. The preferred conditions include using sodium hydroxide as the base in DMSO at ambient temperature. The general procedure comprises starting with the hydrazone or its derivative dissolved in DMSO in approximately a 0.5–1.0 M concentration at ambient temperature. The solution is then treated with approximately 1 equivalent of NaOH and followed by addition of approximately 1 equivalent of carbon disulfide. The resulting solution is then stirred (for example, for approximately 1 hour at ambient temperature) before addition of approximately 1 equivalent of an alkylation agent. Work-up may comprise addition of water, extraction with organic solvent, and drying. The desired control agent may be purified by chromatography and/or recrystallization and may be characterized by $^1$H NMR, $^{13}$C NMR, and GC/MS.

Emulsion Polymerization Processes

In the broadest sense, an emulsion polymerization is any heterogeneous polymerization in an aqueous environment. Typically, these systems produce particles of polymer as product. Those skilled in the art recognize many variants of these heterogeneous polymerizations, including true emulsions, micro emulsions, mini emulsions, suspensions and dispersions. These processes are generally distinguished by differences in process, components or results, with specific factors including the presence, amount and type of surfactant required; presence, amount and type of intitiator; presence, type and amount of monomer, including monomer solubility; polymerization kinetics; temperature; order of addition of the components, including the timing of addition of the components (e.g., monomer); solubility of the polymeric product; agitation; presence of co-solvents; resulting particle size; particle stability in the polymerization system toward coagulation or sedimentation; and other factors known to those skilled in the art. In some embodiments of this invention, systems that employ a shearing force or step to create small particle sizes are excluded.

One specifically preferred embodiment of the invention is a controlled heterogenous polymerization reaction in an emulsion characterized by particle sizes ranging from 20 to 1000 nm, and preferably from 30 to 600 nm or from 40 to 300 nm. Polymerizations of this embodiment may have process parameters similar to those discussed above for "traditional" or "true" emulsion polymerizations. These emulsions are stable (on the order of many months with no observed coagulation or sedimentation), yet are prepared using surfactant in amounts less than 3% by weight to monomer.

The use of control agents under emulsion conditions offers other benefits associated with living kinetics (e.g., linear increase in molecular weight as a function of conversion). The controlled free radical emulsion polymerizations of the invention provide a high degree of control over molecular weight, especially at high molecular weight, (as high as ≧20,000, or even ≧100,000), often with narrow molecular weight distribution (polydispersity ($M_W/M_N$) generally less than 2 and preferably between 1.1 and 1.8).

In the heterogeneous polymerization process of this invention, the control agent is combined with water, optionally surfactant, initiator, and at least one monomer. Polymerization conditions include a temperature in the range of from about 25° C. to about 150° C., preferably between about 35° C. and about 110° C., more preferably between about 50° C. and about 100° C., and most preferably between about 60° C. and about 90° C.

Polymerization conditions also include a pressure between about ambient pressure up to about 100 atmospheres. Polymerization conditions also include the time for reaction, which may be from about 0.5 hours to about 72 hours, preferably in the range of from about 1 hour to about 24 hours, more preferably in the range of from about 2 hours to about 12 hours.

Surfactants can be useful in the processes and composition of this invention. Suitable surfactants include any species or mixture of species capable of stabilizing colloidal emulsions. Generally surfactants are amphiphilic molecules comprising both hydrophobic and hydrophilic regions, which are capable of adsorbing to surfaces. Surfactants may be small molecules or polymers, micelle forming or non-micelle forming and may be anionic, cationic, zwitterionic or nonionic. In some embodiments, it may be desirable to use mixtures of surfactants, for example to enhance particle stability or control particle formation. Surfactants can play an important role in determining particle size, particle distribution, particle formation and the stability of the resulting polymer emulsion, which are factors that those of skill in the art typically consider when choosing a surfactant for any specific embodiment. Typical amounts of surfactants range from about 0.01 to about 200% by weight relative to the monomer, with a more preferred range being from about 0.1 to about 5% by weight and more specifically preferred being from about 0.5 to about 3% by weight.

Suitable surfactants include anionic, small molecule surfactants including substituted or unsubstituted hydrocarbyl sulfates, sulfonates, carboxylates, phosphonates and phosphates, having between 6 and 30 carbon atoms per anionic functional group. When the hydrocarbyl group is substituted, it may have one or more hydrogen or carbon atoms replaced with another atom selected from the group consisting of N, S, O, Si, F, Cl, Br and I. The hydrocarbyl may also have one or more hydrogen or carbon atom replaced with a functionality such as a keto, ester, amide, ether, thioether and the like. Specific examples of anionic, non-polymeric surfactants include sodium dodecyl sulfate, sodium dodecylbenzene sulfonate, $C_{14}$–$C_{16}$ α-olefin sulfonate, oleoyl methyltaurine, alkyl sulfosuccinate, sodium stearate, alkyl substituted disulfonated diphenyloxide and nonylphenoxy oligo(ethylene glycol) sulfate. Ionic polymers can be used, including polyethyleneimine, polyacrylic acid, carboxymethyl cellulose and the like. Suitable cationic surfactants include cetyltrimethyl ammonium bromide, N-methyl(4-dodecylpyridinium bromide). Suitable nonionic surfactants include ethoxylated mono-, di- and triaikylphenols (degree of ethoxylation: 3 to 100, alkyl radical: $C_4$ to $C_{12}$), ethoxylated fatty alcohols (degree of ethoxylation: 3 to 100, preferably 6 to 50, alkyl radical: $C_6$ to $C_{20}$) and alkali metal and ammonium salts of alkylsulfates (alkyl radical: $C_8$ to $C_{18}$), of sulfuric half-esters of ethoxylated alkanols (degree of ethoxylation: 1 to 70, in particular 2 to 10, alkyl radical: $C_{10}$ to $C_{18}$) and of ethoxylated alkylphenols (degree of ethoxylation: 3 to 100, preferably 6 to 50, alkyl radical: $C_4$ to $C_{18}$) and alkali metal and ammonium salts of alkanesulfonic acids (alkyl radical: $C_{10}$ to $C_{18}$) and of alkylarylsulfonic acids (alkyl radical: $C_9$ to $C_{18}$). Further suitable surfactants, such as sulfosuccinates, are described in Houben-Weyl, Methoden der organischen Chemie, Volume XIV/1, Makromolekulare Stoffe, Georg-Thieme Verlag, Stuttgart, 1961, pages 192 to 208. Alternative surfactants include functional monomers, polymerizable surfactants and water-soluble surface-active polymers, including block copolymers, such as polyethyleneoxide-b-polypropyleneoxide-b-polyethyleneoxide (Pluronic™). Specific examples include polyvinyl alcohols, cellulose derivatives or vinylpyrrolidone-containing copolymers. A detailed description of further suitable protective colloids is given in Houben-Weyl, Methoden der organischen Chemie, Volume XIV/1, Makromolekulare Stoffe, Georg-Thieme-Verlag, Stuttgart, 1961, pages 411 to 420. Currently commercially available surfactants that are useful in this invention are listed below in Table 1.

TABLE 1

| Trade Name | Supplier | Contents |
|---|---|---|
| Ionics | | |
| Abex VA-50 | Rhodia | 46%; 1:1 mix of anionic and ethoxylated octyl phenol |
| Abex 2020 | Rhodia | Anionic/non-ionic mix (APE free), 30% |
| Abex 2030 | Rhodia | Anionic/non-ionic mix (APE free), 30% |
| Abex 18-S | Rhodia | Na Ether Sulfates; APE-free, 35% |
| Abex 12-S | Rhodia | Na Ether Sulfates; APE-free, 30% |
| Aerosol OT | Sigma | [(Bis-2-ethylhexyl)sodium sulfosuccinate, $C_{20}H_{37}O_7S.Na$, $M_w$ 444.6, 10% |
| Aerosol 22 | Sigma | [(Bis-2-ethylhexyl)sodium sulfosuccinate, $C_{20}H_{37}O_7S.Na$, $M_w$ 444.6, neat d = 1.12 |
| Calfax DB-45 | Pilot Chemical | $C_{12}$(branched) Sodium diphenyloxide disulfonate, 45% |
| Calfax 16L-35 | Pilot Chemical | $C_{16}$ (linear) Sodium diphenyloxide disulfonate, 35% |
| Calimulse L-30 | Pilot Chemical | Sodium linear alkyl benzene sulfonate 30% |
| Calimulse EM-30 | Pilot Chemical | Sodium branched dodecyl benzene sulfonate 30% |
| Calsoft F-90 | Pilot Chemical | Sodium linear alkyl benzene sulfonate, solid, 90+% |
| Dowfax C6L | Dow | Disulfonated diphenyloxide with $C_6$ backbone |
| Dowfax C10L | Dow | Disulfonated diphenyloxide with $C_{10}$ backbone |
| Dowfax 8390 | Dow | Disulfonated diphenyloxide with $C_{16}$ backbone, 45% |
| Emulgator 825 | BASF | anionic/non-ionic mix |
| Emulgator 825-S | BASF | anionic/non-ionic mix |
| Rhodacal A-246/L | Rhodia | sodium alpha C14–C16 olefin sulfonate (38–41%) |
| Rhodacal DS-4 | Rhodia | sodium dodecyl benzene sulfonate 23% |
| SDS | Aldrich | sodium dodecyl sulfate |
| SDBS | Aldrich | sodium dodecyl benzene sulfonate 90% |
| Triton QS-30 | Union Carbide | 90%, gel like |
| Triton X-200 | Union Carbide | 28% aq dispersion |
| Atphos 3232 | ICI | Polyoxyethylene phosphate ester |
| Atphos 3226 | ICI | anionic sfac, phosphoric acid |
| Atphos 3202 | ICI | NonylPE n = 6, acid form, 100% |
| Nonionics | | |
| Abex 2545 | Rhodia | |
| Abex 2535 | Rhodia | |
| Dynol 604 | Air Products | Ethoxylated acetylenic diols, 100% |
| Igepal CO-210 | Aldrich | APE ($C_9H_{19}$—$C_6H_4$—$(OCH_2CH_2)_2OH$) 100% |

TABLE 1-continued

| Trade Name | Supplier | Contents |
|---|---|---|
| Igepal CO-520 | Aldrich | APB ($C_9H_{19}$—$C_6H_4$—$(OCH_2CH_2)_5OH$) 100% |
| Igepal CA-897 | Rhodia | APE (octylphenol ethoxylate) 70%, n = 40 |
| Igepal CO-897 | Rhodia | APE (nonylphenol ethoxylate) 70% n = 40 |
| Pluronic F38 | BASF | EO-PO-EO block, average $M_w$ 4700 HLB 31 |
| Pluronic F98 | BASF | EO-PO-EO block, average $M_w$ 13K, HLB 28 |
| Pluronic P65 | BASF | EO-PO-EO block, average $M_w$ 3400 HLB 17 |
| Surfynol 104 PA | Air Products | 50% in isopropyl alcohol, 50% 2,4,7,9-tetramethyl-5-decyne-4,7,-diol |
| Surfynol 104 PG-50 | Air Products | 50% in propylene glycol, 50% 2,4,7,9-tetramethyl-5-decyne-4,7,-diol |
| Surfynol DF-58 | Air Products | silicone-based |
| Surfynol 440 | Air Products | Surfynol 104 with ethylene oxide chains, more hydrophilic, 100% |
| Surfynol 465 | Air Products | Surfynol 104 with ethylene oxide chains, more hydropbobic, 100% |
| Triton X-100 | Union Carbide | t-octylphenoxy-polyethoxyethanol (n = 9.5), 100% |
| Triton X-405 | Union Carbide | t-octylphenoxy-polyethoxyethanol, 70% |

The process of the invention does not necessarily require surfactant. For example, surfactant-free recipes can be used where the sulfate groups on a persulfate initiator impart the latex stability. In this case, relatively large ratios of initiator to monomer are used (e.g., 50:1 to 250:1) and large particles result (e.g., 300–600 nm). The ratios of components (e.g., initiators, surfactants, monomers, and control agents) in the polymerization mixture may be important and can vary widely depending on the particular application. The ratio of monomer to control agent can be used to determine the molecular weight of polymers produced using the controlled heterogeneous free radical polymerization processes of the invention. According to these processes, the number average molecular weight of the resulting polymers depends linearly on the number of control agents in the polymerization and the mass of monomer.

In some embodiments, the monomer to initiator ratio may be in the range of from about 10:1 to about 10,000:1, more preferably the range of from about 50:1 to about 10,000:1 and most preferably the range of from about 100:1 to about 5000:1. Another ratio that may be controlled is the ratio of equivalents of initiator to control agent, (with the assumption that the amount of initiator is approximately equivalent to the number of radical produced), which is typically in the range of from about 1:0.1 to about 1:10, more preferably the range of from about 1:0.3 to about 1:5 and most preferably the range of from about 1:0.4 to about 1:2. When a redox system is used, it may be present the ratio of initiator to reductant typically in the range of from about 1:0.1 to about 1:4, more preferably the range of from about 1:0.3 to about 1:2 and most preferably the range of from about 1:0.4 to about 1:1.6. The surfactant to monomer ratio may be controlled and is typically in the range of from about 0.0001 to about 2:1, more preferably the range of from about 0.001:1 to about 0.05:1 and most preferably the range of from about 0.001:1 to about 0.02:1 (although for some emulsions there may be no surfactant added at all where other reaction components perform that function). The percent solids may be in the range of from 0.001% to about 90% by volume. In some preferred applications, the novel aqueous polymer emulsions are produced with a solids content of=40%, advantageously=50%, by volume, based on the total aqueous polymer emulsion. The useful solids content for other applications is from 0.5 to 75% by volume. The preparation of the novel aqueous polymer emulsions is carried out according to the product by process definition of the subject according to the invention, as stated at the outset, i.e., by the free radical aqueous emulsion polymerization method in the presence of surface active materials and free radical polymerization initiators. The ratio of the aqueous phase to the total amount of the monomers used in both stages is chosen according to the desired solids content of the aqueous polymer emulsion to be prepared.

The emulsion process can be implemented in a batch, semi-batch or continuous mode. In one embodiment the reaction is operated in such a way as to convert the control agent into dormant chains early in the process. For example, the consumption of the control agent is substantially completed when the cumulative monomer conversion (defined as the ratio monomer converted at time t to the total monomer present in the recipe) is less than about 30%, more specifically less than about 20% and even more specifically less than about 10%. This can be performed by adjusting polymerization process variables, such as the sequence and feed-rate of addition of monomers, control agents, initiators, etc. For example, in a semi-batch polymerization process where a fraction of the monomer is introduced initially in the reactor and the remaining fraction fed over a period of time, the control agent is preferentially added in totality in the initial charge. In a continuous polymerization process (e.g., using either a recirculation loop or a series of continuously stirred tank reactors), the control agent is preferably fed in the upstream part of the continuous process. A preferred polymerization process is semi-batch, with the totality of the control agent fed to the initial charge and where the feed rate of the monomer stream is adjusted to a "starved feed regime", i.e., where the monomer to polymer ratio is maintained below 0.2, preferably 0.05, until the control agent is totally consumed (as measured by gas or liquid chromatography). Process variables that may coincide to control the monomer to polymer ratio are rate of monomer additions, initiator to monomer ratios, temperature and particle size.

A free radical source is provided in the polymerization mixture, which can stem from spontaneous free radical generation upon heating or preferably from a free radical initiator. In the latter case the initiator is added to the polymerization mixture at a concentration high enough to for an acceptable polymerization rate (e.g., commercially significant conversion in a certain period of time, such as listed below). Conversely, a too high free radical initiator to control agent ratio will favor unwanted dead polymer formation through radical-radical coupling reaction leading to polymer materials with uncontrolled characteristics. The molar ratio of free radical initiator to control agent for polymerization are typically in the range of from about 2:1 to about 0.02:1.

Polymerization conditions also include the time for reaction, which may be from about 0.5 hours to about 72 hours, preferably in the range of from about 1 hour to about 24 hours, more preferably in the range of from about 2 hours to about 12 hours. Conversion of monomer to polymer is preferably at least about 75%, more preferably at least about 95% and most preferable at least about 99%.

The polymerization process generally proceeds in a "living" type manner. Thus, generally an approximately linear relationship between conversion and number average molecular weight can be observed, although this is not a pre-requisite. The living character manifests itself by the ability to prepare block copolymers: hence, a polymer chain is first grown with monomer A, and then, when monomer A is depleted, monomer B is added to extend the first block of polymer A with a second block of polymer B. Thus, in some instances, particularly when the chain transfer constant of the control agent, Ct, is low (Ct being defined as the ratio of the transfer rate coefficient to the propagation rate constant), e.g., Ct less than 2, the molecular weight to conversion plot might not exhibit a linear trend: this does not preclude however that block copolymer formation did not occur. Block copolymer formation through a living process can be demonstrated using analytical techniques such as polymer fractionation with selective solvent (of polymer A, polymer B, respectively), gradient elution chromatography and/or 2-dimensional chromatography. Block copolymers tend to microphase-separate and organize in a variety of morphologies that can be probed by physical techniques such as X-ray diffraction, dynamic mechanical testing, and the like.

When present, initiators useful in the polymerization mixture, and may be selected from the group consisting of sodium, potassium and ammonium salts of persulfate, alkyl peroxides, substituted alkyl peroxides, aryl peroxides, substituted aryl peroxides, acyl peroxides, alkyl hydroperoxides, substituted alkyl hydroperoxides, aryl hydroperoxides, substituted aryl hydroperoxides, heteroalkyl peroxides, substituted heteroalkyl peroxides, heteroalkyl hydroperoxides, substituted heteroalkyl hydroperoxides, heteroaryl peroxides, substituted heteroaryl peroxides, heteroaryl hydroperoxides, substituted heteroaryl hydroperoxides, alkyl peresters, substituted alkyl peresters, aryl peresters, substituted aryl peresters, and azo compounds. Specific initiators include benzoylperoxide (BPO) and AIBN. Preferred initiators are water-soluble salts of persulfate.

Optionally, after the polymerization is over (e.g., completed or terminated) the thio-moiety (e.g., a dithio-moiety) of the control agent can be cleaved by chemical or thermal ways, if one wants to reduce the sulfur content of the polymer and prevent any problems associated with presence of the control agents chain ends, such as odor or discoloration. Typical chemical treatment includes the catalytic or stoichiometric addition of base such as sodium hydroxide, a primary amine, acid or anhydride, or oxidizing agents such as hypochlorite salts.

Generally, monomers that may be polymerized using the methods of this invention (and from which M, below, may be derived) include at least one monomer is selected from the group consisting of styrene, substituted styrene, alkyl acrylate, substituted alkyl acrylate, alkyl methacrylate, substituted alkyl methacrylate, acrylonitrile, methacrylonitrile, acrylamide, methacrylamide, N-alkylacrylamide, N-alkylmethacrylamide, N,N-dialkylacrylamide, N,N-dialkylmethacrylamide, isoprene, butadiene, ethylene, vinyl acetate and combinations thereof. Functionalized versions of these monomers may also be used. Specific monomers or comonomers that may be used in this invention include methyl methacrylate, ethyl methacrylate, propyl methacrylate (all isomers), butyl methacrylate (all isomers), 2-ethylhexyl methacrylate, isobornyl methacrylate, methacrylic acid, benzyl methacrylate, phenyl methacrylate, methacrylonitrile, α-methylstyrene, methyl acrylate, ethyl acrylate, propyl acrylate (all isomers), butyl acrylate (all isomers), 2-ethylhexyl acrylate, isobornyl acrylate, acrylic acid, benzyl acrylate, phenyl acrylate, acrylonitrile, styrene, glycidyl methacrylate, 2-hydroxyethyl methacrylate, hydroxypropyl methacrylate (all isomers), hydroxybutyl methacrylate (all isomers), N,N-dimethylaminoethyl methacrylate, N,N-diethylaminoethyl methacrylate, triethyleneglycol methacrylate, itaconic anhydride, itaconic acid, glycidyl acrylate, 2-hydroxyethyl acrylate, hydroxypropyl acrylate (all isomers), hydroxybutyl acrylate (all isomers), N,N-dimethylaminoethyl acrylate, N,N-diethylaminoethyl acrylate, triethyleneglycol acrylate, methacrylamide, N-methylacrylamide, N,N-dimethylacryladmide, N-tert-butylmethacrylamide, N-n-butylmethacrylamide, N-methylolmethacrylamide, N-ethylolmethacrylamide, N-tert-butylacrylamide, N-n-butylacrylamide, N-methylolacrylamide, N-ethylolacrylamide, 4-acryloylmorpholine, vinyl benzoic acid (all isomers), diethylaminostyrene (all isomers), α-methylvinyl benzoic acid (all isomers), diethylamino a-methylstyrene (all isomers), p-vinylbenzene sulfonic acid, p-vinylbenzene sulfonic sodium salt, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dibutoxymethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, maleic anhydride, N-phenyhnaleimide, N-butylmaleimide, butadiene, isoprene, chloroprene, ethylene, vinyl acetate and combinations thereof.

Polymers

The polymers formed with the control agents of this invention are believed to be grown via a degenerative transfer mechanism. Thus, upon analysis of the obtained polymers, monomers might appear between the $R^1$—S bond, and any of the above formulas can be rewritten in a polymeric form. For example, the polymers of this invention may be characterized by the general formula:

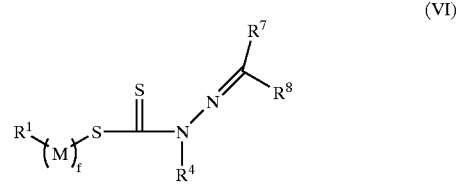

(VI)

wherein M is a monomer or mixture of monomers or at least 2 blocks of different monomer (any from the above lists) and f is the degree of polymerization, and $R^1$, $R^4$, $R^7$ and $R^8$ are as defined above.

The formulas for multifinctional control agents can also be written in polymer form, as follows:

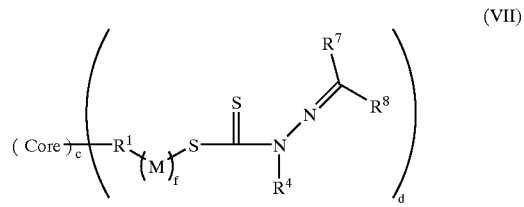

(VII)

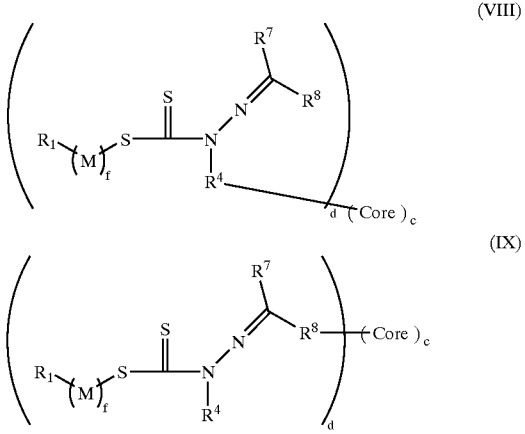

wherein each of the variable in formulas (VII) to (IX) have the above stated meanings.

In some embodiments of this invention, it is desirable to make a block copolymer, such as for example with both hydrophobic and hydrophilic monomers, with these monomers being selected from the above lists. In this case, the monomers M in the above formulas will be A and B or more blocks.

As used herein, "block copolymer" refers to a polymer comprising at least two segments of differing composition; having any one of a number of different architectures, where the monomers are not incorporated into the polymer architecture in a solely statistical or uncontrolled manner. Although there may be three, four or more monomers in a single block-type polymer architecture, it will still be referred to herein as a block copolymer. In some embodiments, the block copolymer will have an A-B architecture (with "A" and "B" representing the monomers). Other architectures included within the definition of block copolymer include A-B-A, A-B-A-B, A-B-C, A-B-C-A, A-B-C-A-B, A-B-C-B, A-B-A-C (with "C" representing a third monomer), and other combinations that will be obvious to those of skill in the art. Block copolymers can be prepared a number of ways, including sequential addition of monomers or using multi-functional control agents described above. Of course with multi-functional control agents, the control agent may form a linking group between one or more blocks of the copolymers.

In another embodiment, the block copolymers of this invention include one or more blocks of random copolymer together with one or more blocks of single monomers. Thus, a polymer architecture of A-R, A-R-B, A-B-R, A-R-B-R-C, etc. is included herein, where R is a random block of monomers A and B or of monomers B and C. Moreover, the random block can vary in composition or size with respect to the overall block copolymer. In some embodiments, for example, the random block R will account for between 5 and 80% by weight of the mass of the block copolymer. In other embodiments, the random block R will account for more or less of the mass of the block copolymer, depending on the application. Furthermore, the random block may have a compositional gradient of one monomer to the other (e.g., A:B) that varies across the random block in an algorithmic fashion, with such algorithm being either linear having a desired slope, exponential having a desired exponent (such as a number from 0.1–5) or logarithmic. The random block may be subject to the same kinetic effects, such as composition drift, that would be present in any other radical copolymerization and its composition, and size may be affected by such kinetics, such as Markov kinetics. Any of the monomers listed elsewhere in this specification may be used in the block copolymers of this invention.

A "block" within the scope of the block copolymers of this invention typically comprises about 10 or more monomers of a single type (with the random blocks being defined by composition and/or weight percent, as described above). In preferred embodiments, the number of monomers within a single block is about 15 or more, about 20 or more or about 50 or more. However, in an alternative embodiment, the block copolymers of this invention include blocks where a block is defined as two or more monomers that are not represented elsewhere in the copolymer. This definition is intended to encompass adding small amounts of a second monomer at one or both ends of a substantially homopolymeric polymer. In this alternative embodiment, the same copolymer architectures discussed above apply. This definition is therefore intended to include telechelic polymers, which include one or more functional end groups capable of reacting with other molecules. Thus, generally, a telechelic polymer is a block copolymer with in the definitions of this invention. The functional groups present at one or both ends of a telechelic polymer may be those known to those of skill in the art, including, for example, hydroxide, aldehyde, carboxylic acid or carboxylate, halogen, amine and the like, which have the ability to associate or form bonds with another molecule. Likewise, the block copolymers of the invention are intended to encompass telechelic polymers containing bifunctional groups, such as allyl-terminated or vinylterminated telechelics, sometimes referred to as macromonomers or macromers because of their ability to participate in polymerization reactions through the terminal functional group.

Combining the above embodiments provides a particularly powerful method of designing block copolymers. For example, a block copolymer may have the architecture F-A-B-F, where F represents functional groups that may be the same or different within a single F-A-B-F structure (which, therefore, may encompass F-A-B-F'). Other block copolymer architectures within the scope of this invention include A-R-B-F and F-A-R-B-F. Other architectures will be apparent to those of skill in the art upon review of this specification—indeed, without wishing to be bound by any particular theory—it is the living nature of the emulsions of this invention that provide the ability to even make these novel block copolymers.

In one embodiment, block copolymers are assembled by the sequential addition of different monomers or monomer mixtures to living polymerization reactions. In another embodiment, the addition of a pre-assembled functionalized block (such as a telechelic oligomer or polymer) to a living free radical polymerization mixture yields a block copolymer. Ideally, the growth of each block occurs to high conversion. Conversions are determined by size exclusion chromatography (SEC) via integration of polymer to monomer peak. For UV detection, the polymer response factor must be determined for each polymer/monomer polymerization mixture. Typical conversions can be 50% to 100% for each block. Intermediate conversion can lead to block copolymers with a random copolymer block separating the two or more homopolymer blocks, depending on the relative rates of polymerization and monomer addition. At high conversion, the size of this random block is sufficiently small such that it is less to affect polymer properties such as phase separation, thermal behavior and mechanical modulus. This fact can be intentionally exploited to improve polymerization times for many applications without measurably affecting the performance characteristics of the resulting polymer. This is achieved by intentionally "killing" or terminating the living nature of the polymerization when a desired level of conversion (e.g., >80%) is reached by neutralizing the control agent, for example by introducing acids, bases, oxidizing agents, reducing agents, radical sources, scavengers, etc. In the absence of control agent, the polymerization continues uncontrolled (typically at much higher reaction rates) until the remaining monomer is consumed. Block copolymer can also be created by grafting monomers, monomer mixtures, oligomers or polymers only polymers having multiple available functional groups.

Block copolymers allow the combination of potentially diverse polymer properties (such as hard/soft and/or hydrophilic/hydrophobic (amphiphilic) blocks) into a single polymer chain. Hard/soft block copolymers combine segments with significantly different glass transition temperatures $T_g$. A typical hard/soft copolymer pairs a relatively "hard" block (e.g., styrene) with a relatively "soft" block (e.g., butyl acrylate). The resulting materials can possess performance attributes not found in any of the constituent segments. The presence of microphase separation and various phase morphologies in block copolymers is associated with unique performance attributes of many block copolymers. For example, by combining the stiffness or rigidity characteristic of hard materials with the compliance of soft materials, block copolymers may exhibit advantageous properties, such as processability under melt conditions, elasticity, resistance to abrasion and cracking and desired creep characteristics (corresponding to the material's ability to hold its shape under external stresses) depending on morphology, making them appropriate for use as extrudable bulk materials, coatings and separation media. The exact properties of a hard/soft copolymer depend significantly on the difference between the glass transition temperatures of the constituent blocks; accordingly, selection of monomers having glass transition temperatures a particular distance apart can lead to hard/soft block copolymers having particular desired characteristics. Thus, while for one application it may be appropriate to combine blocks having glass transition temperatures that differ by, for example, 20° C., the choice of $T_g$ (and therefore of materials) depends on the application.

Likewise, the amphiphilic block copolymers produced according to the invention display combinations of hydrophobic and hydrophilic properties that make such materials appropriate for use as surfactants or dispersants, scavengers, surface treatments and the like. Different block sizes over all ratios of monomers and molecular weights lead to families of novel compounds, for example thermoplastics, elastomers, adhesives, and polymeric micelles.

Multi-arm or star polymers can be generated using initiators capable of initiating multiple free radical polymerizations under the controlled conditions of the invention. Such initiators include, for example polyfunctional control agents, discussed above. Following initiation, the growth of each arm is controlled by the same living kinetics described for linear polymers, making it possible to assemble star polymers whose arms include individual homopolymers as well as di, tri or higher order block copolymers. Alternatively, multi-arm polymers are formed by growing end-finctionalized oligomers or polymers followed by the addition of a cross-linking monomer such as ethylene glycol diacrylate, divinyl benzene, methylene bisacrylamide, trimetylol propane triacrylate, etc. The small hydrodynamic volume of star polymers produced according to these methods provides properties such as low viscosity, high $M_W$, and high functionality useful in applications such as rheology control, thermosets, and separation media. Similarly, the inclusion of branched or multiple ethylenically unsaturated monomers enables the preparation of graft polymers, again exhibiting the living kinetics characteristic of this invention. The existence of a block copolymer according to this invention is determined by methods known to those of skill in the art, including nuclear magnetic resonance (NMR), measured increase of molecular weight upon addition of a second monomer to chain-extend a living polymerization of a first monomer, microphase separation (e.g., long range order, microscopy and/or birefringence measurements), mechanical property measurements, (e.g., elasticity of hard/soft block copolymers), thermal analysis and chromatography (e.g., absence of homopolymer).

EXAMPLES

General:

Syntheses of control agents were carried out under a nitrogen or argon atmosphere. Other chemicals were purchased from commercial sources and used as received, except for monomers, which were degassed by applying vacuum. All polymerizations were performed in glass reactors sealed with septums at the top. Reagents were added via pipette or liquid handling robot. The semi-continuous polymerization process generally involves periodic addition of monomer and other reagents, by depositing about 3–15 µl of monomer, initiator and surfactant at intervals of about 4–8 minutes, for a total of about 1–2 mL added to each reactor over the course of about 4–5 hours.

Size Exclusion Chromatography was performed using an automated gel permeation chromatography system with THF as the eluent and polystyrene-based columns, as described in U.S. Pat. No. 6,260,407, which is incorporated herein by reference. All of the molecular weight and polydispersity index (PDI) results obtained are relative to linear polystyrene standards. Monomer consumptions were determined by using an automated HP 5800 gas chromatography system (available from Hewlett-Packard). Latex particle sizes were measured by using a parallel dynamic light scattering device, such as that described in U.S. patent application No. 09/689,553, filed Oct. 11, 2000, which is incorporated herein by reference. Solid content conversion was based gravimetrical measurement of samples.

Example 1

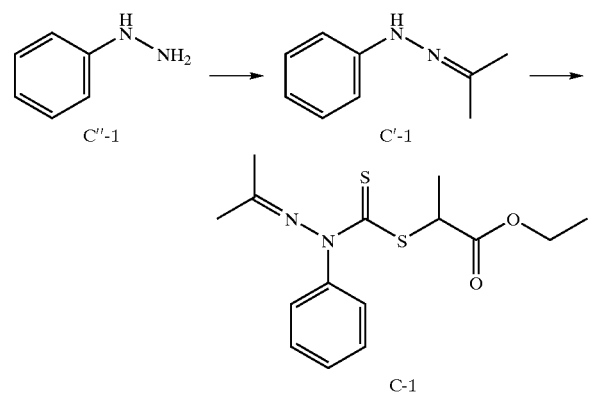

A 100 mL round-bottomed flask was charged with hydrazine C"-1 (3 mL, 30 mnmol), and acetone (20 mL) at ambient temperature. The excess of acetone was removed under reduced pressure to give a quantitative yield of hydrazone C'-1. The flask then equipped with a magnetic stir bar and maintained under a nitrogen atmosphere was charged with sodium hydroxide (1.2 g, 30 mmol), and dimethylsulfoxide (DMSO) (60 mL) at ambient temperature. The reaction mixture was kept in a water bath. To the resulting solution, carbon disulfide (1.8 mL, 30 mmol) was added dropwise. The mixture was stirred for an additional one hour after the addition was finished. Ethyl 2-bromopropionate (3.9 mL, 30 mmol) was then added to the reaction mixture dropwise. After the reaction was completed, as monitored by thin layer chromatography, the reaction mixture was poured into 120 mL of water and followed by extraction with ethyl acetate (2×80 mL). The organic layer was further washed with water (2×80 mL) and dried over $MgSO_4$. The solvent was removed under reduced pressure and the product was further purified by flash chromatograph. The desired control agent C-1 was obtained in 65% yield (6.3 g).

Examples 2–169

These examples demonstrate polymerization of n-butyl acrylate in emulsion using the control agent C-1, whose synthesis is described above in Example 1. Each of the polymerizations was carried out in the same general way, a semi-continuous process. Portions of monomer, initiator, and surfactant and other ingredients including water, stabilizing monomer, and sodium bicarbonate were charged initially in the reaction vessel at ambient temperature. The mixture was then brought to the reaction temperature 80° C. in 5 minutes. The rest of monomer in neat and the rest of initiator and surfactant as an aqueous solution were semi-continuously added, started when reaction reached the reaction temperature, into reaction vessel over a course of 4 hours and 5 hours respectively. After the last addition was finished, each reaction was allowed to further proceed for an additional two hours. For each polymerization a total mass of 3 g was carried out. The monomer is in a 33.3 wt % concentration. Sodium persulfate was the initiator used in each polymerization. Surfactants used were sodium dodecyl sulfate (SDS), sodium dodecylbenzenesulfonate (SDBS), a commercial formulation Rhodacal A-246/L. Sodium bicarbonate was used as a buffering agent. Two types of stabilizing monomer including methallyl sulfonate (MS) and acrylic acid (AA) were investigated. The control agent in each polymerization was 0.5 mole % relative to the amount of monomer for a targeted molecular weight of 280,000 g/mol at complete monomer conversion. Automated dispensing of reaction components created the polymerization mixture of each reaction. The detail stoichiometry is reported in Table 3 and the results of these polymerizations are reported in Table 4, below, using the analytical methods described above.

A series of control experiments was also carried out, where the same polymerization mixtures were created, but no control agent was added. The results of these control experiments are not reported in detail; in general stable latex with gels or very high molecular weight polymers were obtained.

TABLE 3

Process variables
(The numbers are wt % relative to the total monomer)

| Example | Monomer Initial charge/ continuous addition | Initiator Initial charge/ continuous addition | Surfactant Type | Surfactant Initial charge/ continuous addition | $NaHCO_3$ | Stabilizer type (amount) |
|---|---|---|---|---|---|---|
| 2 | 5/95 | 0.1/0.4 | SDS | 0.5/2.0 | 0.35 | MS(0.5) |
| 3 | 10/90 | 0.1/0.4 | SDS | 0.5/2.0 | 0.35 | MS(0.5) |
| 4 | 15/85 | 0.1/0.4 | SDS | 0.5/2.0 | 0.35 | MS(0.5) |
| 5 | 20/80 | 0.1/0.4 | SDS | 0.5/2.0 | 0.35 | MS(0.5) |
| 6 | 25/75 | 0.1/0.4 | SDS | 0.5/2.0 | 0.35 | MS(0.5) |
| 7 | 30/70 | 0.1/0.4 | SDS | 0.5/2.0 | 0.35 | MS(0.5) |
| 8 | 5/95 | 0.12/0.38 | SDS | 0.6/1.9 | 0.35 | MS(0.5) |
| 9 | 10/90 | 0.12/0.38 | SDS | 0.6/1.9 | 0.35 | MS(0.5) |
| 10 | 15/85 | 0.12/0.38 | SDS | 0.6/1.9 | 0.35 | MS(0.5) |
| 11 | 20/80 | 0.12/0.38 | SDS | 0.6/1.9 | 0.35 | MS(0.5) |
| 12 | 25/75 | 0.12/0.38 | SDS | 0.6/1.9 | 0.35 | MS(0.5) |
| 13 | 30/70 | 0.12/0.38 | SDS | 0.6/1.9 | 0.35 | MS(0.5) |
| 14 | 5/95 | 0.14/0.36 | SDS | 0.7/1.8 | 0.35 | MS(0.5) |
| 15 | 10/90 | 0.14/0.36 | SDS | 0.7/1.8 | 0.35 | MS(0.5) |
| 16 | 15/85 | 0.14/0.36 | SDS | 0.7/1.8 | 0.35 | MS(0.5) |
| 17 | 20/80 | 0.14/0.36 | SDS | 0.7/1.8 | 0.35 | MS(0.5) |
| 18 | 25/75 | 0.14/0.36 | SDS | 0.7/1.8 | 0.35 | MS(0.5) |
| 19 | 30/70 | 0.14/0.36 | SDS | 0.7/1.8 | 0.35 | MS(0.5) |
| 20 | 5/95 | 0.16/0.34 | SDS | 0.8/1.7 | 0.35 | MS(0.5) |
| 21 | 10/90 | 0.16/0.34 | SDS | 0.8/1.7 | 0.35 | MS(0.5) |
| 22 | 15/85 | 0.16/0.34 | SDS | 0.8/1.7 | 0.35 | MS(0.5) |
| 23 | 20/80 | 0.16/0.34 | SDS | 0.8/1.7 | 0.35 | MS(0.5) |
| 24 | 25/75 | 0.16/0.34 | SDS | 0.8/1.7 | 0.35 | MS(0.5) |
| 25 | 30/70 | 0.16/0.34 | SDS | 0.8/1.7 | 0.35 | MS(0.5) |
| 26 | 5/95 | 0.05/0.2 | SDS | 0.5/1.0 | 0.30 | MS(0) |
| 27 | 10/90 | 0.05/0.2 | SDS | 0.5/1.0 | 0.30 | MS(0) |
| 28 | 15/85 | 0.05/0.2 | SDS | 0.5/1.0 | 0.30 | MS(0) |
| 29 | 5/95 | 0.06/0.19 | SDS | 0.6/0.9 | 0.30 | MS(0) |
| 30 | 10/90 | 0.06/0.19 | SDS | 0.6/0.9 | 0.30 | MS(0) |
| 31 | 15/85 | 0.06/0.19 | SDS | 0.6/0.9 | 0.30 | MS(0) |
| 32 | 5/95 | 0.05/0.2 | SDS | 0.5/1.0 | 0.30 | MS(0.5) |
| 33 | 10/90 | 0.05/0.2 | SDS | 0.5/1.0 | 0.30 | MS(0.5) |
| 34 | 15/85 | 0.05/0.2 | SDS | 0.5/1.0 | 0.30 | MS(0.5) |
| 35 | 5/95 | 0.06/0.19 | SDS | 0.6/0.9 | 0.30 | MS(0.5) |
| 36 | 10/90 | 0.06/0.19 | SDS | 0.6/0.9 | 0.30 | MS(0.5) |
| 37 | 15/85 | 0.06/0.19 | SDS | 0.6/0.9 | 0.30 | MS(0.5) |
| 38 | 5/95 | 0.05/0.2 | SDS | 0.5/1.0 | 0.30 | MS(1.0) |
| 39 | 10/90 | 0.05/0.2 | SDS | 0.5/1.0 | 0.30 | MS(1.0) |
| 40 | 15/85 | 0.05/0.2 | SDS | 0.5/1.0 | 0.30 | MS(1.0) |
| 41 | 5/95 | 0.06/0.19 | SDS | 0.6/0.9 | 0.30 | MS(1.0) |
| 42 | 10/90 | 0.06/0.19 | SDS | 0.6/0.9 | 0.30 | MS(1.0) |
| 43 | 15/85 | 0.06/0.19 | SDS | 0.6/0.9 | 0.30 | MS(1.0) |
| 44 | 5/95 | 0.05/0.2 | SDS | 0.5/1.0 | 0.30 | MS(1.5) |
| 45 | 10/90 | 0.05/0.2 | SDS | 0.5/1.0 | 0.30 | MS(1.5) |
| 46 | 15/85 | 0.05/0.2 | SDS | 0.5/1.0 | 0.30 | MS(1.5) |
| 47 | 5/95 | 0.06/0.19 | SDS | 0.6/0.9 | 0.30 | MS(1.5) |
| 48 | 10/90 | 0.06/0.19 | SDS | 0.6/0.9 | 0.30 | MS(1.5) |
| 49 | 15/85 | 0.06/0.19 | SDS | 0.6/0.9 | 0.30 | MS(1.5) |
| 50 | 5/95 | 0.05/0.2 | SDS | 0.5/1.0 | 0.30 | AA(0) |
| 51 | 10/90 | 0.05/0.2 | SDS | 0.5/1.0 | 0.30 | AA(0) |
| 52 | 15/85 | 0.05/0.2 | SDS | 0.5/1.0 | 0.30 | AA(0) |
| 53 | 5/95 | 0.06/0.19 | SDS | 0.6/0.9 | 0.30 | AA(0) |
| 54 | 10/90 | 0.06/0.19 | SDS | 0.6/0.9 | 0.30 | AA(0) |
| 55 | 15/85 | 0.06/0.19 | SDS | 0.6/0.9 | 0.30 | AA(0) |
| 56 | 5/95 | 0.05/0.2 | SDS | 0.5/1.0 | 0.30 | AA(0.5) |
| 57 | 10/90 | 0.05/0.2 | SDS | 0.5/1.0 | 0.30 | AA(0.5) |
| 58 | 15/85 | 0.05/0.2 | SDS | 0.5/1.0 | 0.30 | AA(0.5) |
| 59 | 5/95 | 0.06/0.19 | SDS | 0.6/0.9 | 0.30 | AA(0.5) |
| 60 | 10/90 | 0.06/0.19 | SDS | 0.6/0.9 | 0.30 | AA(0.5) |
| 61 | 15/85 | 0.06/0.19 | SDS | 0.6/0.9 | 0.30 | AA(0.5) |
| 62 | 5/95 | 0.05/0.2 | SDS | 0.5/1.0 | 0.30 | AA(1.0) |
| 63 | 10/90 | 0.05/0.2 | SDS | 0.5/1.0 | 0.30 | AA(1.0) |
| 64 | 15/85 | 0.05/0.2 | SDS | 0.5/1.0 | 0.30 | AA(1.0) |
| 65 | 5/95 | 0.06/0.19 | SDS | 0.6/0.9 | 0.30 | AA(1.0) |
| 66 | 10/90 | 0.06/0.19 | SDS | 0.6/0.9 | 0.30 | AA(1.0) |
| 67 | 15/85 | 0.06/0.19 | SDS | 0.6/0.9 | 0.30 | AA(1.0) |
| 68 | 5/95 | 0.05/0.2 | SDS | 0.5/1.0 | 0.30 | AA(1.5) |
| 69 | 10/90 | 0.05/0.2 | SDS | 0.5/1.0 | 0.30 | AA(1.5) |

TABLE 3-continued

Process variables
(The numbers are wt % relative to the total monomer)

| Example | Monomer Initial charge/continuous addition | Initiator Initial charge/continuous addition | Surfactant Type | Surfactant Initial charge/continuous addition | NaHCO₃ | Stabilizer type (amount) |
|---|---|---|---|---|---|---|
| 70 | 15/85 | 0.05/0.2 | SDS | 0.5/1.0 | 0.30 | AA(1.5) |
| 71 | 5/95 | 0.06/0.19 | SDS | 0.6/0.9 | 0.30 | AA(1.5) |
| 72 | 10/90 | 0.06/0.19 | SDS | 0.6/0.9 | 0.30 | AA(1.5) |
| 73 | 15/85 | 0.06/0.19 | SDS | 0.6/0.9 | 0.30 | AA(1.5) |
| 74 | 5/95 | 0.19/0.31 | SDS | 1.5/1.0 | 0 | MS(0) |
| 75 | 5/95 | 0.19/0.31 | SDS | 1.5/1.0 | 0 | MS(0.5) |
| 76 | 5/95 | 0.19/0.31 | SDS | 1.5/1.0 | 0 | MS(1.0) |
| 77 | 5/95 | 0.19/0.31 | SDS | 1.5/1.0 | 0.35 | MS(0) |
| 78 | 5/95 | 0.19/0.31 | SDS | 1.5/1.0 | 0.35 | MS(0.5) |
| 79 | 5/95 | 0.19/0.31 | SDS | 1.5/1.0 | 0.35 | MS(1.0) |
| 80 | 10/90 | 0.19/0.31 | SDS | 1.5/1.0 | 0 | MS(0) |
| 81 | 10/90 | 0.19/0.31 | SDS | 1.5/1.0 | 0 | MS(0.5) |
| 82 | 10/90 | 0.19/0.31 | SDS | 1.5/1.0 | 0 | MS(1.0) |
| 83 | 10/90 | 0.19/0.31 | SDS | 1.5/1.0 | 0.35 | MS(0) |
| 84 | 10/90 | 0.19/0.31 | SDS | 1.5/1.0 | 0.35 | MS(0.5) |
| 85 | 10/90 | 0.19/0.31 | SDS | 1.5/1.0 | 0.35 | MS(1.0) |
| 86 | 15/85 | 0.19/0.31 | SDS | 1.5/1.0 | 0 | MS(0) |
| 87 | 15/85 | 0.19/0.31 | SDS | 1.5/1.0 | 0 | MS(0.5) |
| 88 | 15/85 | 0.19/0.31 | SDS | 1.5/1.0 | 0 | MS(1.0) |
| 89 | 15/85 | 0.19/0.31 | SDS | 1.5/1.0 | 0.35 | MS(0) |
| 90 | 15/85 | 0.19/0.31 | SDS | 1.5/1.0 | 0.35 | MS(0.5) |
| 91 | 15/85 | 0.19/0.31 | SDS | 1.5/1.0 | 0.35 | MS(1.0) |
| 92 | 20/80 | 0.19/0.31 | SDS | 1.5/1.0 | 0 | MS(0) |
| 93 | 20/80 | 0.19/0.31 | SDS | 1.5/1.0 | 0 | MS(0.5) |
| 94 | 20/80 | 0.19/0.31 | SDS | 1.5/1.0 | 0 | MS(1.0) |
| 95 | 20/80 | 0.19/0.31 | SDS | 1.5/1.0 | 0.35 | MS(0) |
| 96 | 20/80 | 0.19/0.31 | SDS | 1.5/1.0 | 0.35 | MS(0.5) |
| 97 | 20/80 | 0.19/0.31 | SDS | 1.5/1.0 | 0.35 | MS(1.0) |
| 98 | 5/95 | 0.19/0.31 | SDS | 1.5/1.0 | 0 | AA(0) |
| 99 | 5/95 | 0.19/0.31 | SDS | 1.5/1.0 | 0 | AA(0.5) |
| 100 | 5/95 | 0.19/0.31 | SDS | 1.5/1.0 | 0 | AA(1.0) |
| 101 | 5/95 | 0.19/0.31 | SDS | 1.5/1.0 | 0.35 | AA(0) |
| 102 | 5/95 | 0.19/0.31 | SDS | 1.5/1.0 | 0.35 | AA(0.5) |
| 103 | 5/95 | 0.19/0.31 | SDS | 1.5/1.0 | 0.35 | AA(1.0) |
| 104 | 10/90 | 0.19/0.31 | SDS | 1.5/1.0 | 0 | AA(0) |
| 105 | 10/90 | 0.19/0.31 | SDS | 1.5/1.0 | 0 | AA(0.5) |
| 106 | 10/90 | 0.19/0.31 | SDS | 1.5/1.0 | 0 | AA(1.0) |
| 107 | 10/90 | 0.19/0.31 | SDS | 1.5/1.0 | 0.35 | AA(0) |
| 108 | 10/90 | 0.19/0.31 | SDS | 1.5/1.0 | 0.35 | AA(0.5) |
| 109 | 10/90 | 0.19/0.31 | SDS | 1.5/1.0 | 0.35 | AA(1.0) |
| 110 | 15/85 | 0.19/0.31 | SDS | 1.5/1.0 | 0 | AA(0) |
| 111 | 15/85 | 0.19/0.31 | SDS | 1.5/1.0 | 0 | AA(0.5) |
| 112 | 15/85 | 0.19/0.31 | SDS | 1.5/1.0 | 0 | AA(1.0) |
| 113 | 15/85 | 0.19/0.31 | SDS | 1.5/1.0 | 0.35 | AA(0) |
| 114 | 15/85 | 0.19/0.31 | SDS | 1.5/1.0 | 0.35 | AA(0.5) |
| 115 | 15/85 | 0.19/0.31 | SDS | 1.5/1.0 | 0.35 | AA(1.0) |
| 116 | 20/80 | 0.19/0.31 | SDS | 1.5/1.0 | 0 | AA(0) |
| 117 | 20/80 | 0.19/0.31 | SDS | 1.5/1.0 | 0 | AA(0.5) |
| 118 | 20/80 | 0.19/0.31 | SDS | 1.5/1.0 | 0 | AA(1.0) |
| 119 | 20/80 | 0.19/0.31 | SDS | 1.5/1.0 | 0.35 | AA(0) |
| 120 | 20/80 | 0.19/0.31 | SDS | 1.5/1.0 | 0.35 | AA(0.5) |
| 121 | 20/80 | 0.19/0.31 | SDS | 1.5/1.0 | 0.35 | AA(1.0) |
| 122 | 5/95 | 0.1/0.4 | SDBS | 0.5/2.0 | 0.35 | MS(0) |
| 123 | 10/90 | 0.1/0.4 | SDBS | 0.5/2.0 | 0.35 | MS(0) |
| 124 | 15/85 | 0.1/0.4 | SDBS | 0.5/2.0 | 0.35 | MS(0) |
| 125 | 5/95 | 0.1/0.4 | SDBS | 0.5/2.0 | 0.35 | MS(0.5) |
| 126 | 10/90 | 0.1/0.4 | SDBS | 0.5/2.0 | 0.35 | MS(0.5) |
| 127 | 15/85 | 0.1/0.4 | SDBS | 0.5/2.0 | 0.35 | MS(0.5) |
| 128 | 5/95 | 0.12/0.38 | SDBS | 0.6/1.9 | 0.35 | MS(0) |
| 129 | 10/90 | 0.12/0.38 | SDBS | 0.6/1.9 | 0.35 | MS(0) |
| 130 | 15/85 | 0.12/0.38 | SDBS | 0.6/1.9 | 0.35 | MS(0) |
| 131 | 5/95 | 0.12/0.38 | SDBS | 0.6/1.9 | 0.35 | MS(0.5) |
| 132 | 10/90 | 0.12/0.38 | SDBS | 0.6/1.9 | 0.35 | MS(0.5) |
| 133 | 15/85 | 0.12/0.38 | SDBS | 0.6/1.9 | 0.35 | MS(0.5) |
| 134 | 5/95 | 0.14/0.36 | SDBS | 0.7/1.8 | 0.35 | MS(0) |
| 135 | 10/90 | 0.14/0.36 | SDBS | 0.7/1.8 | 0.35 | MS(0) |
| 136 | 15/85 | 0.14/0.36 | SDBS | 0.7/1.8 | 0.35 | MS(0) |
| 137 | 5/95 | 0.14/0.36 | SDBS | 0.7/1.8 | 0.35 | MS(0.5) |
| 138 | 10/90 | 0.14/0.36 | SDBS | 0.7/1.8 | 0.35 | MS(0.5) |
| 139 | 15/85 | 0.14/0.36 | SDBS | 0.7/1.8 | 0.35 | MS(0.5) |
| 140 | 5/95 | 0.16/0.34 | SDBS | 0.8/1.7 | 0.35 | MS(0) |
| 141 | 10/90 | 0.16/0.34 | SDBS | 0.8/1.7 | 0.35 | MS(0) |
| 142 | 15/85 | 0.16/0.34 | SDBS | 0.8/1.7 | 0.35 | MS(0) |
| 143 | 5/95 | 0.16/0.34 | SDBS | 0.8/1.7 | 0.35 | MS(0.5) |
| 144 | 10/90 | 0.16/0.34 | SDBS | 0.8/1.7 | 0.35 | MS(0.5) |
| 145 | 15/85 | 0.16/0.34 | SDBS | 0.8/1.7 | 0.35 | MS(0.5) |
| 146 | 5/95 | 0.1/0.4 | Rhodacal A-246/L | 0.5/2.0 | 0.35 | MS(0) |
| 147 | 10/90 | 0.1/0.4 | Rhodacal A-246/L | 0.5/2.0 | 0.35 | MS(0) |
| 148 | 15/85 | 0.1/0.4 | Rhodacal A-246/L | 0.5/2.0 | 0.35 | MS(0) |
| 149 | 5/95 | 0.1/0.4 | Rhodacal A-246/L | 0.5/2.0 | 0.35 | MS(0.5) |
| 150 | 10/90 | 0.1/0.4 | Rhodacal A-246/L | 0.5/2.0 | 0.35 | MS(0.5) |
| 151 | 15/85 | 0.1/0.4 | Rhodacal A-246/L | 0.5/2.0 | 0.35 | MS(0.5) |
| 152 | 5/95 | 0.12/0.38 | Rhodacal A-246/L | 0.6/1.9 | 0.35 | MS(0) |
| 153 | 10/90 | 0.12/0.38 | Rhodacal A-246/L | 0.6/1.9 | 0.35 | MS(0) |
| 154 | 15/85 | 0.12/0.38 | Rhodacal A-246/L | 0.6/1.9 | 0.35 | MS(0) |
| 155 | 5/95 | 0.12/0.38 | Rhodacal A-246/L | 0.6/1.9 | 0.35 | MS(0.5) |
| 156 | 10/90 | 0.12/0.38 | Rhodacal A-246/L | 0.6/1.9 | 0.35 | MS(0.5) |
| 157 | 15/85 | 0.12/0.38 | Rhodacal A-246/L | 0.6/1.9 | 0.35 | MS(0.5) |
| 158 | 5/95 | 0.14/0.36 | Rhodacal A-246/L | 0.7/1.8 | 0.35 | MS(0) |
| 159 | 10/90 | 0.14/0.36 | Rhodacal A-246/L | 0.7/1.8 | 0.35 | MS(0) |
| 160 | 15/85 | 0.14/0.36 | Rhodacal A-246/L | 0.7/1.8 | 0.35 | MS(0) |
| 161 | 5/95 | 0.14/0.36 | Rhodacal A-246/L | 0.7/1.8 | 0.35 | MS(0.5) |
| 162 | 10/90 | 0.14/0.36 | Rhodacal A-246/L | 0.7/1.8 | 0.35 | MS(0.5) |
| 163 | 15/85 | 0.14/0.36 | Rhodacal A-246/L | 0.7/1.8 | 0.35 | MS(0.5) |
| 164 | 5/95 | 0.16/0.34 | Rhodacal A-246/L | 0.8/1.7 | 0.35 | MS(0) |
| 165 | 10/90 | 0.16/0.34 | Rhodacal A-246/L | 0.8/1.7 | 0.35 | MS(0) |
| 166 | 15/85 | 0.16/0.34 | Rhodacal A-246/L | 0.8/1.7 | 0.35 | MS(0) |
| 167 | 5/95 | 0.16/0.34 | Rhodacal A-246/L | 0.8/1.7 | 0.35 | MS(0.5) |
| 168 | 10/90 | 0.16/0.34 | Rhodacal A-246/L | 0.8/1.7 | 0.35 | MS(0.5) |
| 169 | 15/85 | 0.16/0.34 | Rhodacal A-246/L | 0.8/1.7 | 0.35 | MS(0.5) |

TABLE 4

Results

| Example | Mn | PDI | Particle size Rh (nm) | Monomer conversion (%) | Solid conversion (%) |
|---|---|---|---|---|---|
| 2 | 26597 | 1.49 | 36 | 95 | 91 |
| 3 | 27015 | 1.60 | 44 | 96 | 95 |
| 4 | 26348 | 1.54 | 34 | 96 | 95 |
| 5 | 28577 | 1.57 | 48 | 97 | 95 |
| 6 | 29205 | 1.47 | 36 | 97 | 95 |
| 7 | 27259 | 1.51 | 29 | 96 | 97 |
| 8 | 28441 | 1.46 | 34 | 95 | 94 |
| 9 | 28637 | 1.57 | 32 | 97 | 93 |
| 10 | 27020 | 1.49 | 30 | 96 | 95 |
| 11 | 30412 | 1.55 | 27 | 97 | 87 |
| 12 | 32075 | 1.48 | 32 | 98 | 88 |
| 13 | 28149 | 1.52 | 27 | 95 | 97 |
| 14 | 27700 | 1.55 | 43 | 96 | 96 |
| 15 | 28794 | 1.50 | 31 | 96 | 97 |
| 16 | 28720 | 1.53 | 34 | 96 | 93 |
| 17 | 28131 | 1.50 | 29 | 96 | 98 |
| 18 | 31388 | 1.49 | 31 | 97 | 91 |
| 19 | 28072 | 1.48 | 32 | 96 | 89 |
| 20 | 27628 | 1.48 | 33 | 94 | 96 |
| 21 | 28600 | 1.48 | 29 | 96 | 93 |
| 22 | 31603 | 1.51 | 26 | 97 | 96 |
| 23 | 29065 | 1.50 | 27 | 96 | 94 |
| 24 | 26831 | 1.51 | 28 | 95 | 97 |
| 25 | 26317 | 1.59 | 27 | 96 | 96 |
| 26 | 25300 | 1.55 | 56 | 72 | 70 |
| 27 | 26700 | 1.55 | 50 | 79 | 85 |
| 28 | 29000 | 1.53 | 28 | 82 | 86 |
| 29 | 30600 | 1.57 | 36 | 87 | 84 |
| 30 | 26400 | 1.56 | 48 | 81 | 88 |
| 31 | 26300 | 1.54 | 23 | 71 | 80 |
| 32 | 24600 | 1.56 | 27 | 75 | 77 |
| 33 | 32100 | 1.52 | 28 | 90 | 90 |
| 34 | 27600 | 1.55 | 39 | 84 | 85 |
| 35 | 26100 | 1.56 | 38 | 84 | 93 |
| 36 | 32200 | 1.58 | 25 | 91 | 83 |
| 37 | 26900 | 1.53 | 38 | 82 | 81 |
| 38 | 26700 | 1.62 | 53 | 84 | 89 |
| 39 | 27100 | 1.61 | 29 | 86 | 83 |
| 40 | 28600 | 1.62 | 30 | 89 | 86 |
| 41 | 26400 | 1.63 | 33 | 85 | 92 |
| 42 | 27600 | 1.59 | 29 | 86 | 79 |
| 43 | 26600 | 1.59 | 27 | 81 | 89 |
| 44 | 24700 | 1.58 | 39 | 79 | 91 |
| 45 | 28400 | 1.66 | 35 | 85 | 88 |
| 46 | 28900 | 1.56 | 35 | 85 | 89 |
| 47 | 27700 | 1.62 | 41 | 84 | 88 |
| 48 | 27700 | 1.57 | 33 | 84 | 74 |
| 49 | 26300 | 1.56 | 39 | 82 | 92 |
| 50 | 27400 | 1.61 | 73 | 85 | 83 |
| 51 | 27900 | 1.58 | 32 | 84 | 92 |
| 52 | 28800 | 1.59 | 25 | 88 | 92 |
| 53 | 29600 | 1.53 | 34 | 85 | 92 |
| 54 | 27800 | 1.59 | 25 | 88 | 91 |
| 55 | 25200 | 1.57 | 23 | 81 | 88 |
| 56 | 46700 | 23.69 | 36 | 98 | 70 |
| 57 | 45100 | 1.69 | 50 | 99 | 87 |
| 58 | 40400 | 1.68 | 42 | 99 | 92 |
| 59 | 53000 | 1.79 | 36 | 98 | 86 |
| 60 | 44200 | 1.85 | 42 | 99 | 81 |
| 61 | 38600 | 1.69 | 34 | 98 | 79 |
| 62 | 60400 | 2.01 | 64 | 98 | 85 |
| 63 | 48000 | 2.02 | 73 | 98 | 83 |
| 64 | 52200 | 1.94 | 61 | 98 | 72 |
| 65 | 72100 | 2.13 | 43 | 98 | 74 |
| 66 | 53600 | 2.16 | 69 | 98 | 84 |
| 67 | 50200 | 1.95 | 65 | 98 | 82 |
| 68 | 37500 | 3.16 | 38 | 97 | 65 |
| 69 | 56500 | 1.68 | 62 | 98 | 74 |
| 70 | 40100 | 1.78 | 66 | 98 | 87 |
| 71 | 33300 | 17.50 | 57 | 98 | 100 |
| 72 | 45900 | 4.22 | 63 | 98 | 100 |
| 73 | 30600 | 2.14 | 54 | 98 | 100 |
| 74 | NA | NA | 32 | 97 | 97 |
| 75 | 35800 | 1.81 | 24 | 99 | 75 |
| 76 | 24400 | 1.70 | 26 | 98 | 92 |
| 77 | 27200 | 1.61 | 43 | 98 | 93 |
| 78 | 26000 | 1.62 | 24 | 98 | 91 |
| 79 | 20800 | 1.61 | 36 | 98 | 94 |
| 80 | 29200 | 1.70 | 37 | 98 | 96 |
| 81 | 25400 | 1.60 | 27 | 98 | 95 |
| 82 | 23700 | 1.63 | 25 | 98 | 97 |
| 83 | 27700 | 1.67 | 28 | 97 | 94 |
| 84 | 25400 | 1.66 | 33 | 98 | 98 |
| 85 | 23900 | 1.61 | 33 | 98 | 99 |
| 86 | 28000 | 1.78 | 37 | 98 | 97 |
| 87 | 25600 | 1.64 | 25 | 98 | 95 |
| 88 | 24000 | 1.64 | 23 | 98 | 97 |
| 89 | 26600 | 1.69 | 25 | 97 | 97 |
| 90 | 25700 | 1.62 | 25 | 98 | 97 |
| 91 | 23700 | 1.70 | 31 | 98 | 99 |
| 92 | 27600 | 1.86 | 34 | 96 | 86 |
| 93 | 25300 | 1.64 | 33 | 98 | 98 |
| 94 | 25400 | 1.62 | 23 | 98 | 97 |
| 95 | 26500 | 1.78 | 42 | 98 | 98 |
| 96 | 25200 | 1.62 | 26 | 98 | 100 |
| 97 | 23000 | 1.66 | 32 | 97 | 100 |
| 98 | 25000 | 1.76 | 42 | 94 | 100 |
| 99 | 31100 | 2.25 | 35 | 99 | 59 |
| 100 | 49000 | 2.67 | 36 | 100 | 68 |
| 101 | 24400 | 1.77 | 38 | 97 | 100 |
| 102 | 21600 | 1.67 | 34 | 99 | 98 |
| 103 | 38800 | 2.61 | 32 | 99 | 77 |
| 104 | 21300 | 1.91 | 43 | 97 | 99 |
| 105 | 48300 | 2.49 | 38 | 99 | 70 |
| 106 | 49000 | 2.87 | 39 | 99 | 66 |
| 107 | 22700 | 1.61 | 27 | 92 | 100 |
| 108 | 20900 | 1.82 | 26 | 99 | 99 |
| 109 | 23300 | 1.90 | 29 | 99 | 90 |
| 110 | 23400 | 1.81 | 38 | 95 | 99 |
| 111 | 39800 | 2.64 | 45 | 99 | 68 |
| 112 | 35900 | 2.59 | 47 | 99 | 69 |
| 113 | 21200 | 1.66 | 27 | 95 | 97 |
| 114 | 21100 | 1.67 | 26 | 99 | 93 |
| 115 | 22100 | 1.91 | 25 | 99 | 85 |
| 116 | 22900 | 1.66 | 31 | 96 | 83 |
| 117 | 43100 | 2.11 | 44 | 99 | 65 |
| 118 | 39800 | 2.32 | 42 | 99 | 69 |
| 119 | 22900 | 1.62 | 30 | 96 | 96 |
| 120 | 25800 | 1.91 | 25 | 99 | 81 |
| 121 | 27000 | 2.08 | 34 | 99 | 70 |
| 122 | 15400 | 1.49 | 37 | 98 | 65 |
| 123 | 34100 | 2.01 | 48 | 98 | 80 |
| 124 | 25800 | 1.74 | 33 | 96 | 96 |
| 125 | 18400 | 2.93 | 50 | 97 | 97 |
| 126 | 23700 | 1.80 | 50 | 97 | 100 |
| 127 | 22400 | 1.68 | 51 | 96 | 100 |
| 128 | 25600 | 1.62 | 38 | 93 | 98 |
| 129 | 27600 | 1.75 | 36 | 95 | 97 |
| 130 | 25500 | 1.61 | 35 | 94 | 96 |
| 131 | 24200 | 1.90 | 51 | 97 | 100 |
| 132 | 24300 | 2.10 | 53 | 97 | 100 |
| 133 | 24100 | 1.66 | 50 | 97 | 97 |
| 134 | 25200 | 1.68 | 40 | 94 | 95 |
| 135 | 25900 | 1.80 | 34 | 97 | 98 |
| 136 | 24500 | 1.61 | 36 | 94 | 99 |
| 137 | 22000 | 2.36 | 53 | 96 | 97 |
| 138 | 23100 | 1.97 | 53 | 97 | 99 |
| 139 | 23000 | 1.86 | 47 | 97 | 100 |
| 140 | 24700 | 1.66 | 36 | 95 | 99 |
| 141 | 25500 | 1.83 | 35 | 95 | 95 |
| 142 | 26600 | 1.82 | 32 | 96 | 95 |
| 143 | 22500 | 2.06 | 53 | 96 | 100 |
| 144 | 22700 | 1.96 | 50 | 97 | 100 |
| 145 | 24500 | 1.75 | 47 | 97 | 99 |
| 146 | 10600 | 1.70 | 47 | 99 | 84 |
| 147 | 16900 | 1.76 | 40 | 94 | 100 |

TABLE 4-continued

Results

| Example | Mn | PDI | Particle size Rh (nm) | Monomer conversion (%) | Solid conversion (%) |
|---|---|---|---|---|---|
| 148 | 18800 | 2.14 | 31 | 98 | 92 |
| 149 | 17100 | 2.09 | 28 | 97 | 97 |
| 150 | 16100 | 1.92 | 28 | 99 | 100 |
| 151 | NA | NA | 34 | 96 | 100 |
| 152 | 15200 | 1.70 | 36 | 91 | 96 |
| 153 | 18900 | 2.02 | 38 | 98 | 88 |
| 154 | 14900 | 1.76 | 35 | 95 | 98 |
| 155 | 14900 | 1.82 | 35 | 97 | 99 |
| 156 | 15700 | 1.92 | 29 | 97 | 96 |
| 157 | 14500 | 1.73 | 31 | 95 | 100 |
| 158 | 14500 | 1.75 | 33 | 93 | 99 |
| 159 | 18100 | 2.26 | 26 | 97 | 90 |
| 160 | 15400 | 1.79 | 30 | 96 | 94 |
| 161 | 13900 | 1.75 | 35 | 95 | 100 |
| 162 | 15100 | 2.21 | 28 | 97 | 99 |
| 163 | 13800 | 1.76 | 30 | 96 | 99 |
| 164 | 12900 | 1.82 | 40 | 90 | 97 |
| 165 | 14100 | 1.87 | 26 | 95 | 98 |
| 166 | 14400 | 2.49 | 27 | 97 | 89 |
| 167 | 13400 | 2.11 | 30 | 97 | 99 |
| 168 | 12500 | 1.77 | 27 | 95 | 97 |
| 169 | 12100 | 1.75 | 32 | 95 | 99 |

These examples show that the control agent of this invention provides good latex stability, a quantitative yield of polymer, a controlled molecular weight and low polydispersity in a wide variety of polymerization conditions.

Comparative Examples 170–193

Comparative examples were run in the same manner as examples 2–169 above, but using a different control agent, with the control agent is these examples having the structure:

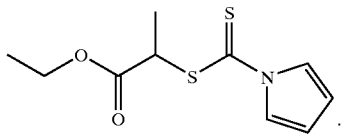

This control agent was prepared in a manner known in the art; see for example, WO99/31144. When tested under bulk conditions, this control agent lead to a polymer with controlled characteristics and a polydisperisty of 1.24 at ca. 90% conversion. Table 5 presents the experimental conditions used in the emulsion polymerizations using this control agent and Table 6 presents the results:

TABLE 5

Process variables
(The numbers are wt % relative to the total monomer)

| Example | Monomer Initial charge/ continuous addition | Initiator Initial charge/ continuous addition | Surfactant Type | Surfactant Initial charge/ continuous addition | NaHCO₃ | Stabilizer type (amount) |
|---|---|---|---|---|---|---|
| 170 | 5/95 | 0.1/0.4 | SDS | 0.5/2.0 | 0.35 | MS(0.5) |
| 171 | 10/90 | 0.1/0.4 | SDS | 0.5/2.0 | 0.35 | MS(0.5) |
| 172 | 15/85 | 0.1/0.4 | SDS | 0.5/2.0 | 0.35 | MS(0.5) |
| 173 | 20/80 | 0.1/0.4 | SDS | 0.5/2.0 | 0.35 | MS(0.5) |
| 174 | 25/75 | 0.1/0.4 | SDS | 0.5/2.0 | 0.35 | MS(0.5) |
| 175 | 30/70 | 0.1/0.4 | SDS | 0.5/2.0 | 0.35 | MS(0.5) |
| 176 | 5/95 | 0.12/0.38 | SDS | 0.6/1.9 | 0.35 | MS(0.5) |
| 177 | 10/90 | 0.12/0.38 | SDS | 0.6/1.9 | 0.35 | MS(0.5) |
| 178 | 15/85 | 0.12/0.38 | SDS | 0.6/1.9 | 0.35 | MS(0.5) |
| 179 | 20/80 | 0.12/0.38 | SDS | 0.6/1.9 | 0.35 | MS(0.5) |
| 180 | 25/75 | 0.12/0.38 | SDS | 0.6/1.9 | 0.35 | MS(0.5) |
| 181 | 30/70 | 0.12/0.38 | SDS | 0.6/1.9 | 0.35 | MS(0.5) |
| 182 | 5/95 | 0.14/0.36 | SDS | 0.7/1.8 | 0.35 | MS(0.5) |
| 183 | 10/90 | 0.14/0.36 | SDS | 0.7/1.8 | 0.35 | MS(0.5) |
| 184 | 15/85 | 0.14/0.36 | SDS | 0.7/1.8 | 0.35 | MS(0.5) |
| 185 | 20/80 | 0.14/0.36 | SDS | 0.7/1.8 | 0.35 | MS(0.5) |
| 186 | 25/75 | 0.14/0.36 | SDS | 0.7/1.8 | 0.35 | MS(0.5) |
| 187 | 30/70 | 0.14/0.36 | SDS | 0.7/1.8 | 0.35 | MS(0.5) |
| 188 | 5/95 | 0.16/0.34 | SDS | 0.8/1.7 | 0.35 | MS(0.5) |
| 189 | 10/90 | 0.16/0.34 | SDS | 0.8/1.7 | 0.35 | MS(0.5) |
| 190 | 15/85 | 0.16/0.34 | SDS | 0.8/1.7 | 0.35 | MS(0.5) |
| 191 | 20/80 | 0.16/0.34 | SDS | 0.8/1.7 | 0.35 | MS(0.5) |
| 192 | 25/75 | 0.16/0.34 | SDS | 0.8/1.7 | 0.35 | MS(0.5) |
| 193 | 30/70 | 0.16/0.34 | SDS | 0.8/1.7 | 0.35 | MS(0.5) |

TABLE 6

Results for Comparative Examples

| Example | Mn | PDI | Particle size Rh (nm) | Monomer conversion (%) | Solid conversion (%) |
|---|---|---|---|---|---|
| 170 | 162626 | 16.04 | 42 | 99 | 99 |
| 171 | 222086 | 25.53 | 44 | 98 | 100 |
| 172 | 168762 | 50 | 36 | 99 | 100 |
| 173 | 204592 | 33.79 | 38 | 99 | 100 |
| 174 | 190414 | 35.18 | 39 | 99 | 100 |
| 175 | 114566 | 7.33 | 43 | 99 | 100 |
| 176 | 168770 | 31.83 | 46 | 98 | 100 |
| 177 | 180454 | 33.38 | 39 | 98 | 100 |
| 178 | 212703 | 27.76 | 44 | 98 | 100 |
| 179 | 166667 | 21.95 | 42 | 98 | 100 |
| 180 | 199547 | 42.46 | 35 | 99 | 100 |
| 181 | 192968 | 31.62 | 36 | 99 | 100 |
| 182 | 207935 | 29.51 | 41 | 98 | 100 |
| 183 | 160429 | 39.46 | 35 | 99 | 100 |
| 184 | 257670 | 28.52 | 38 | 98 | 100 |
| 185 | 70404 | 7.37 | 39 | 99 | 100 |
| 186 | 169302 | 40.86 | 32 | 99 | 100 |
| 187 | 218549 | 30.91 | 36 | 99 | 100 |
| 188 | 152887 | 29.89 | 41 | 98 | 100 |
| 189 | 155982 | 36.14 | 36 | 98 | 99 |
| 190 | 226514 | 34.05 | 36 | 98 | 100 |
| 191 | 162853 | 36.14 | 32 | 99 | 100 |
| 192 | 187029 | 29.57 | 32 | 98 | 100 |
| 193 | 133599 | 22.45 | 33 | 99 | 100 |

These results show that the control agent in these comparative examples does not provide control over the molecular weight and leads to broad molecular weight distributions with a polydispersity index greater than 10.

Example 194

Diblock copolymerization of n-butyl acrylate/styrene in emulsion can be accomplished using the control agent C-1, whose synthesis is described above in Example 1. The polymerization is carried out in one-pot procedure, where the second monomer and additional initiator are introduced subsequently after polymerization of first monomer is complete. The first block of poly n-butyl acrylate is prepared using the conditions described in example 7, above. This results in poly n-butyl acrylate emulsion at 80° C. to which styrene in amount of 813 mg and 1.5 mL of sodium persulfate aqueous solution in 0.33 wt % concentration are semi-continuously added over the course of 6 and 7 hours, respectively. The reaction mixture is then stirred for an additional 2 hours after the last addition is finished. A stable emulsion is formed and its detail characterization is reported in Table 7.

TABLE 7

Result of poly(n-butyl acrylate)-block-polystyrene

| Example | Mn | PDI | Particle size Rh (nm) | Monomer conversion BA/Styrene (%) | Solid conversion (%) |
|---|---|---|---|---|---|
| 194 | 47059 | 1.80 | 65 | 99/95 | 98 |

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purposes.

What is claimed is:

1. A method of free radical polymerization comprising (1) forming a mixture of one or more monomers, water, optionally surfactant, at least one free radical source and a control agent and (2) subjecting said mixture to polymerization conditions, wherein said control agent is characterized by the general formula:

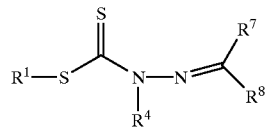

wherein $R^1$ is generally any group that is sufficiently labile to be expelled as its free radical form; $R^4$ is selected from the group consisting of hydrogen, hydrocarbyl, substituted hydrocarbyl, heteroatom-containing hydrocarbyl, and substituted heteroatom-containing hydrocarbyl, and combinations thereof; and $R^7$ and $R^8$ are independently selected from the group consisting of hydrogen, hydrocarbyl, substituted hydrocarbyl, heteroatom-containing hydrocarbyl, and substituted heteroatom-containing hydrocarbyl, and combinations thereof.

2. The method of claim 1, wherein $R^4$ is selected from the group consisting of optionally substituted alkyl and optionally substituted aryl.

3. The method of claim 1, wherein $R^1$ is selected from the group consisting of optionally substituted alkyl, optionally substituted aryl, optionally substituted alkenyl, optionally substituted alkoxy, optionally substituted heterocyclyl, optionally substituted alkylthio, optionally substituted amino and optionally substituted polymer chains.

4. The method of claim 3, wherein $R^1$ is selected from the group consisting of —$CH_2Ph$, —$CH(CH_3)CO_2CH_2CH_3$, —$CH(CO_2CH_2CH_3)_2$, —$C(CH_3)_2CN$, —$CH(Ph)CN$ and —$C(CH_3)_2Ph$.

5. The method of claim 1, wherein $R^7$ and $R^8$ are each independently selected from the group consisting of hydrogen, optionally substituted alkyl, optionally substituted aryl, optionally substituted alkenyl, optionally substituted acyl, optionally substituted, aroyl, optionally substituted alkoxy, optionally substituted heteroaryl, optionally substituted heterocyclyl, optionally substituted alkylsulfonyl, optionally substituted alkylsulfinyl, optionally substituted alkylphosphonyl, optionally substituted arylsulfinyl, and optionally substituted arylphosphonyl.

6. The method of claim 1, wherein said polymerization conditions comprise a temperature in the range of from about 20° C. to about 110° C.

7. The method of claim 1, wherein two or more monomers are added to said polymerization mixture and said two or more monomers are added sequentially or simultaneously.

8. The method of claim 1, wherein said polymerization conditions comprise a continuous or semi-continuous addition of reagent to said mixture, wherein said addition of reagent comprises addition of said one or more monomers, surfactant, initiator and combinations thereof.

9. The method of claim 1, wherein said polymerization conditions comprise living kinetics.

10. A polymer formed by the method of claim 1.

11. The polymer of claim 10, wherein said copolymer is a block copolymer.

12. The polymer of claim 10, wherein said polymer is in an emulsion.

13. A method of method of heterogeneous free radical polymerization comprising (1) forming a heterogeneous mixture of one or more monomers, at least one free radical source, water, optionally surfactant and a multi-functional control agent and (2) subjecting said heterogeneous mixture to polymerization conditions, wherein said multi-functional control agent is selected from any of the following formulas:

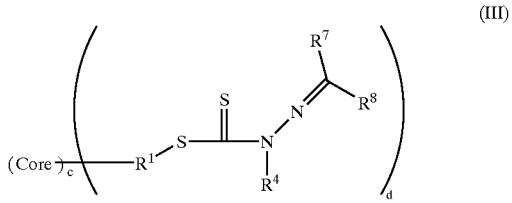

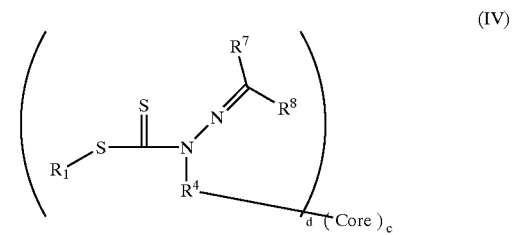

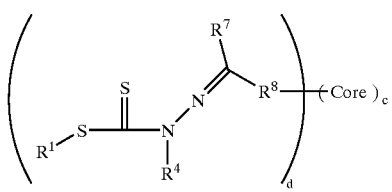

(V)

wherein Core is a multi-functional core molecule, and c is 1 or more and d is 2 or more;

wherein $R^1$ is generally any group that is sufficiently labile to be expelled as its free radical form; $R^4$ is selected from the group consisting of hydrogen, hydrocarbyl, substituted hydrocarbyl, heteroatom-containing hydrocarbyl, and substituted heteroatom-containing hydrocarbyl, and combinations thereof; and $R^7$ and $R^8$ are independently selected from the group consisting of hydrogen, hydrocarbyl, substituted hydrocarbyl, heteroatom-containing hydrocarbyl, and substituted heteroatom-containing hydrocarbyl, and combinations thereof $R^6$ is a substituent on any member of the ring other than the two shown nitrogen atoms.

14. The method of claim 13, wherein $R^1$ is selected from the group consisting of optionally substituted alkyl, optionally substituted aryl, optionally substituted alkenyl, optionally substituted alkoxy, optionally substituted heterocyclyl, optionally substituted alkylthio, optionally substituted amino and optionally substituted polymer chains.

15. The method of claim 14, wherein the multi-functional control agent is not of formula III and $R^1$ is selected from the group consisting of —CH$_2$Ph, —CH(CH$_3$)CO$_2$CH$_2$CH$_3$, —CH(CO$_2$CH$_2$CH$_3$)$_2$, —C(CH$_3$)$_2$CN, —CH(Ph)CN and —C(CH$_3$)$_2$Ph.

16. The method of claim 13, wherein $R^7$ and $R^8$ are each independently selected from the group consisting of hydrogen, optionally substituted alkyl, optionally substituted aryl, optionally substituted alkenyl, optionally substituted acyl, optionally substituted, aroyl, optionally substituted alkoxy, optionally substituted heteroaryl, optionally substituted heterocyclyl, optionally substituted alkylsulfonyl, optionally substituted alkylsulfinyl, optionally substituted alkylphosphonyl, optionally substituted arylsulfinyl, and optionally substituted arylphosphonyl.

17. The method claim 13, wherein $R^4$ is selected from the group consisting of hydrogen, optionally substituted alkyl, optionally substituted aryl, amino, thio, optionally substituted aryloxy and optionally substituted alkoxy.

18. The method of claim 13, wherein said polymerization conditions comprise a temperature in the range of from about 20° C. to about 110° C.

19. The method of claim 13, wherein two or more monomers are added to said heterogeneous polymerization mixture and said two or more monomers are added sequentially or simultaneously.

20. The method of claim 13, wherein said polymerization conditions comprise living kinetics.

21. A polymer formed by the method of claim 13.

22. The polymer of claim 21, wherein said copolymer is a block copolymer.

23. The polymer of claim 21, wherein said polymer is a star or hyperbranched polymer.

24. A compound characterized by the general formula:

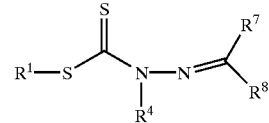

wherein $R^1$ is generally any group that is sufficiently labile to be expelled as its free radical form; $R^4$ is selected from the group consisting of hydrogen, hydrocarbyl, substituted hydrocarbyl, heteroatom-containing hydrocarbyl, and substituted heteroatom-containing hydrocarbyl, and combinations thereof; and $R^7$ and $R^8$ are independently selected from the group consisting of hydrogen, hydrocarbyl, substituted hydrocarbyl, heteroatom-containing hydrocarbyl, and substituted heteroatom-containing hydrocarbyl, and combinations thereof.

* * * * *